(12) United States Patent
Hiroi et al.

(10) Patent No.: US 7,810,164 B2
(45) Date of Patent: Oct. 5, 2010

(54) USER MANAGEMENT METHOD, AND COMPUTER PROGRAM HAVING USER AUTHORIZATION MANAGEMENT FUNCTION

(75) Inventors: Makoto Hiroi, Hamamatsu (JP);
Masahiro Shimizu, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 1127 days.

(21) Appl. No.: 11/272,489

(22) Filed: Nov. 9, 2005

(65) Prior Publication Data

US 2006/0101525 A1 May 11, 2006

(30) Foreign Application Priority Data

Nov. 11, 2004 (JP) ............................. 2004-328296
Nov. 11, 2004 (JP) ............................. 2004-328297

(51) Int. Cl.
*G06F 7/04* (2006.01)
(52) U.S. Cl. .............................. 726/28; 726/26; 726/27
(58) Field of Classification Search ........................ None
See application file for complete search history.

(56) References Cited

U.S. PATENT DOCUMENTS

| 5,192,825 A | 3/1993 | Kunimoto et al. |
| 5,386,568 A | 1/1995 | Wold et al. |
| 5,812,688 A | 9/1998 | Gibson |
| 5,862,231 A | 1/1999 | Tokuhisa et al. |

| 6,057,829 A | 5/2000 | Silfvast |

(Continued)

FOREIGN PATENT DOCUMENTS

JP          62-072049          4/1987

(Continued)

OTHER PUBLICATIONS

DME32 V1.1 Owner's Manual Supplement, Yamaha Corporation, Pro Audio & Digital Musical Instrument Division, Japan, 4 pages.

(Continued)

*Primary Examiner*—Pramila Parthasarathy
(74) *Attorney, Agent, or Firm*—Morrison & Foerster LLP

(57) ABSTRACT

Information entered by a user at the time of logging on is also used in a check to be performed in response to a request for use/edit of a program or data related to an additional function. Authentication information of the user using a program or data related to the additional function is included in advance in the program or data, so that, when the user has made a request for using/edit the program or data, it is checked whether or not the user is a user authorized to use the additional function, using the information entered by the user at the time of logging on and the authentication information. To perform user management for creating an account of a user using an apparatus or software and setting authorization of a user in using the apparatus or software, a plurality of users have parent-child relationships with a highest-position, root user at the top. Each user as a parent is allowed to add a child user, and each parent user is allowed to set authorization of a user lower in hierarchical position than the child user. The parent-child relationships of the users are displayed on a display. Each of the users can give any settable user authorization equal to or lower than its own user authorization.

9 Claims, 13 Drawing Sheets

U.S. PATENT DOCUMENTS

| | | | |
|---|---|---|---|
| H001882 H | 10/2000 | Asthana et al. | |
| 6,327,631 B1 | 12/2001 | Eastty et al. | |
| 6,389,541 B1 * | 5/2002 | Patterson | 726/9 |
| 6,421,692 B1 | 7/2002 | Milne et al. | |
| 6,738,964 B1 | 5/2004 | Zink et al. | |
| 7,164,435 B2 | 1/2007 | Wang et al. | |
| 7,165,005 B2 | 1/2007 | Steger et al. | |
| 7,392,103 B2 | 6/2008 | Takahashi et al. | |
| 7,433,745 B2 | 10/2008 | Aoki et al. | |
| 7,489,978 B2 | 2/2009 | Suyama et al. | |
| 7,552,389 B2 | 6/2009 | Drewes et al. | |
| 2002/0038308 A1 | 3/2002 | Cappi | |
| 2002/0082732 A1 | 6/2002 | Suyama et al. | |
| 2002/0107592 A1 | 8/2002 | Craig | |
| 2003/0212466 A1 | 11/2003 | Alferness | |
| 2004/0133291 A1 | 7/2004 | Nakayama et al. | |
| 2005/0060438 A1 | 3/2005 | Drewes et al. | |
| 2005/0195678 A1 | 9/2005 | Takemura et al. | |
| 2005/0254780 A1 | 11/2005 | Takemura et al. | |
| 2006/0037001 A1 | 2/2006 | Irie et al. | |
| 2006/0143570 A1 | 6/2006 | Washington et al. | |
| 2008/0285757 A1 * | 11/2008 | Bradley et al. | 380/278 |
| 2008/0298591 A1 * | 12/2008 | Bradley et al. | 380/277 |

FOREIGN PATENT DOCUMENTS

| | | |
|---|---|---|
| JP | 64-066768 | 3/1989 |
| JP | 04-302344 | 10/1992 |
| JP | 7-334358 A | 12/1995 |
| JP | 11-298514 | 10/1999 |
| JP | 2000-020377 | 1/2000 |
| JP | 2002-278754 A | 9/2002 |

OTHER PUBLICATIONS

DME 32 Version 1.5 Digital Mixing Engine Owner's Manual Supplement, Yamaha Corporation, Japan, 16 pages.

Digital Mixing Engine DME 32 Owner's Manual, Yamaha Corporation, Pro Audio & Digital Musical Instrument Division, Japan, 296 pages.

Notice of Grounds for Rejection mailed May 14, 2009, for JP Application No. 2004-328296, with English translation, six pages.

Notice of Grounds for Rejection mailed May 14, 2009, for JP Application No. 2004-328297, with English translation, six pages.

Notification of Reasons for Refusal mailed Apr. 7, 2008, for JP Application No. 2004-060099, with English translation, six pages.

Notification of Reasons for Refusal mailed Apr. 7, 2008, for JP Application No. 2004-060100, with English translation, six pages.

Notification of Reasons for Refusal mailed Apr. 7, 2008, for JP Application No. 2004-060101, with English translation, seven pages.

Tono, I. (Sep. 2002). "Creating QuickReport Print Component (Final)," *Dephi Magazine*, 24:52-60.

Yamaha (May 1, 2000). Digital Mixing Engine (DME 32) Owner's Manual, Japanese language version, 299 pages.

Yamaha (May 2001). Manual of Digital Mixing Engine DME32, relevant pp. 1-65, 192-198, total pp. 298.

Yamaha. (2002). Digital Production Console, DM2000 Manual, pp. 139-147, with English translation, 20 pages.

DME 32 Version 1.5 Digital Mixing Engine Owner's Manual Supplement, Yamaha Corporation, Japan, 16 pages, Aug. 2002.

DME32 V1.1 Owner's Manual Supplement, Yamaha Corporation, Pro Audio & Digital Musical Instrument Division, Japan, 4 pages, Aug. 2002.

POLYCOM. (2001). Polycom Conference Composer User Guide, Polycom, Inc. 29 pages.

Yamaha. (Jul. 2003). Digital Mixing Engine (DME 32) Owner's Manual, Japanese Language version, 296 pages, Aug. 2002.

Yamaha. (Jul. 2003). Digital Mixing Engine (DME 32) Owner's Manual, Japanese Language version, 299 pages.

* cited by examiner

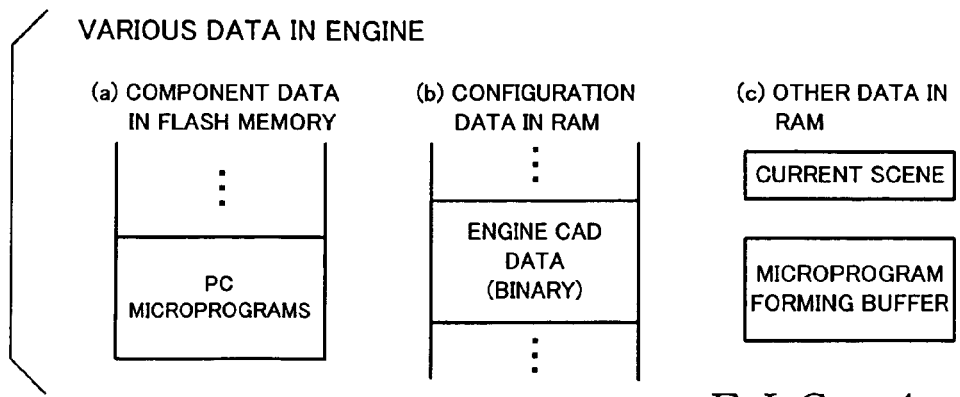
FIG. 4
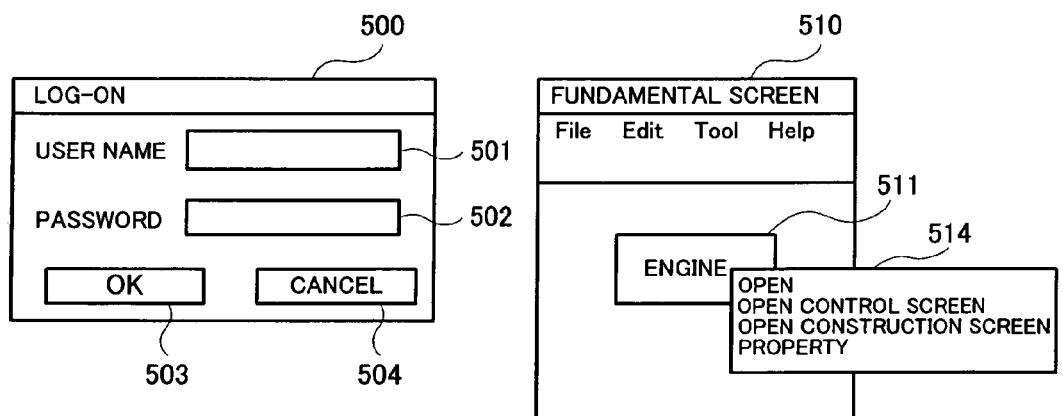
FIG. 5A
FIG. 5B

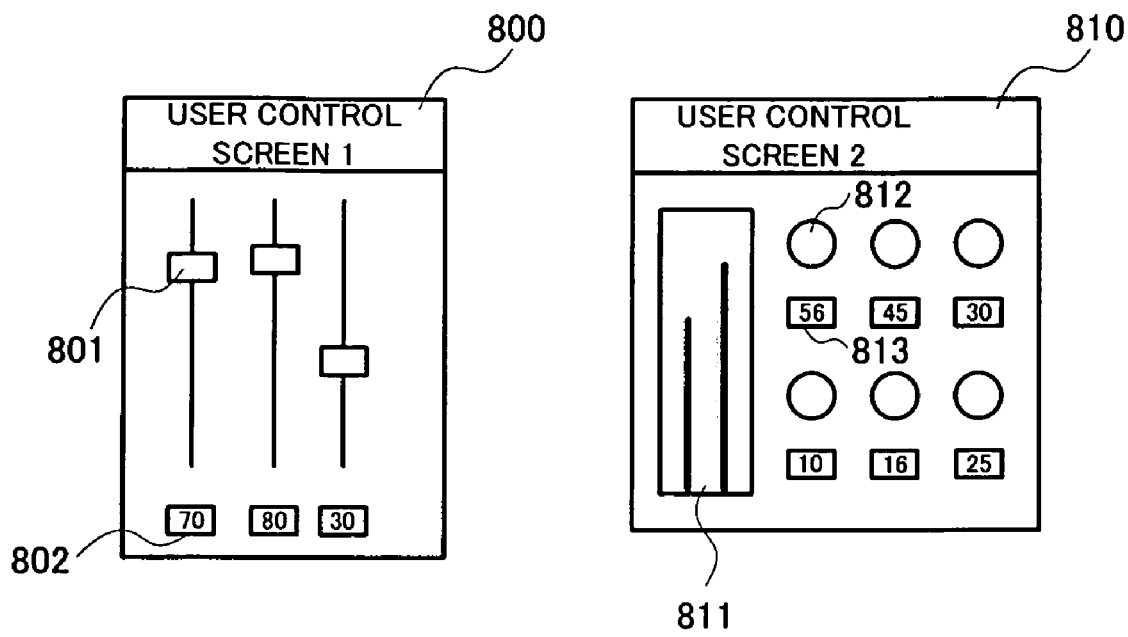
F I G. 8 A   F I G. 8 B

LOGGED-ON USER IS SUPERVISOR B

| USER SELECTED BY TREE | ADD USER BUTTON | REMOVE USER BUTTON | CHANGE BUTTON | CHECK BOX | SECURITY LEVEL SETTING SECTION |
|---|---|---|---|---|---|
| ADMINISTRATOR | GRAY-OUT | GRAY-OUT | GRAY-OUT | GRAY OUT WITH SETTINGS KEPT DISPLAYED | GRAY OUT WITH SETTINGS KEPT DISPLAYED |
| SUPERVISOR A | GRAY-OUT | GRAY-OUT | GRAY-OUT | GRAY OUT WITH SETTINGS KEPT DISPLAYED | GRAY OUT WITH SETTINGS KEPT DISPLAYED |
| SUPERVISOR B (LOGGED-ON) | ENABLED | GRAY-OUT | GRAY-OUT | GRAY OUT WITH SETTINGS KEPT DISPLAYED | GRAY OUT WITH SETTINGS KEPT DISPLAYED |
| OPERATOR A | ENABLED | ENABLED | ENABLED | ENABLED HOWEVER, X MARK IS DISPLAYED FOR EACH ITEM FOR WHICH SUPERVISOR B HAS NO AUTHORIZATION | ENABLED SETTABLE TO LEVEL LOWER THAN LEVEL OF SUPERVISOR B |
| OPERATOR B | ENABLED | ENABLED | ENABLED | ENABLED HOWEVER, X MARK IS DISPLAYED FOR EACH ITEM FOR WHICH SUPERVISOR B HAS NO AUTHORIZATION | ENABLED SETTABLE TO LEVEL LOWER THAN LEVEL OF SUPERVISOR B |
| SUPPORT | ENABLED | ENABLED | ENABLED | ENABLED HOWEVER, X MARK IS DISPLAYED FOR EACH ITEM FOR WHICH OPERATOR A HAS NO AUTHORIZATION | ENABLED SETTABLE TO LEVEL LOWER THAN LEVEL OF OPERATOR A |

FIG. 10A

LOGGED-ON USER IS ADMINISTRATOR

| USER SELECTED BY TREE | ADD USER BUTTON | REMOVE USER BUTTON | CHANGE BUTTON | CHECK BOX | SECURITY LEVEL SETTING SECTION |
|---|---|---|---|---|---|
| ADMINISTRATOR (LOGGED-ON) | ENABLED | GRAY-OUT | ENABLED | ALL CHECKBOXES ENABLED | ENABLED SETTABLE TO DESIRED LEVEL |
| SUPERVISOR A | ENABLED | ENABLED | ENABLED | ALL CHECKBOXES ENABLED | ENABLED SETTABLE TO DESIRED LEVEL |
| SUPERVISOR B | ENABLED | ENABLED | ENABLED | ALL CHECKBOXES ENABLED | ENABLED SETTABLE TO DESIRED LEVEL |
| OPERATOR A | ENABLED | ENABLED | ENABLED | ALL CHECKBOXES ENABLED | ENABLED SETTABLE TO DESIRED LEVEL |
| OPERATOR B | ENABLED | ENABLED | ENABLED | ALL CHECKBOXES ENABLED | ENABLED SETTABLE TO DESIRED LEVEL |
| SUPPORT | ENABLED | ENABLED | ENABLED | ALL CHECKBOXES ENABLED | ENABLED SETTABLE TO DESIRED LEVEL |

FIG. 10B

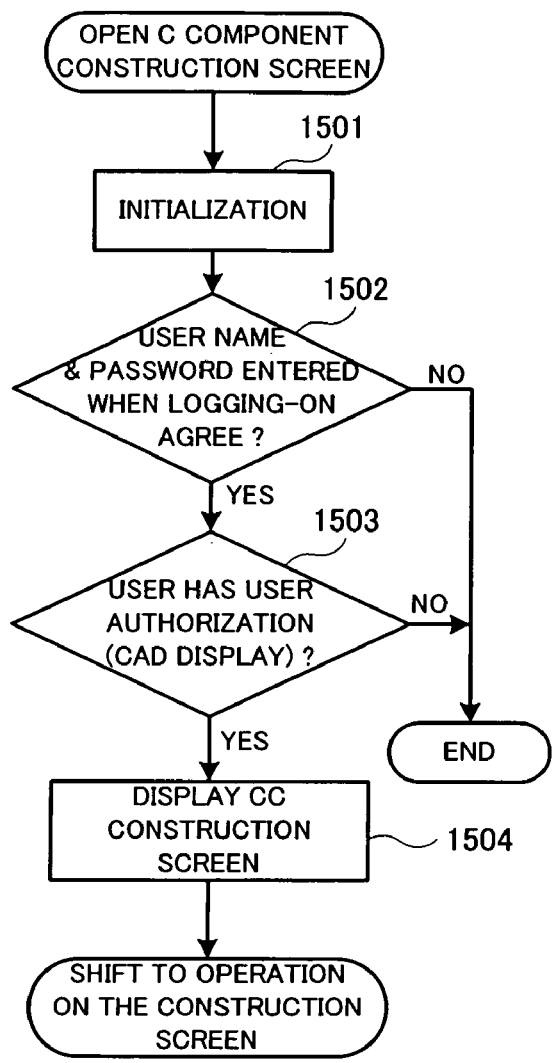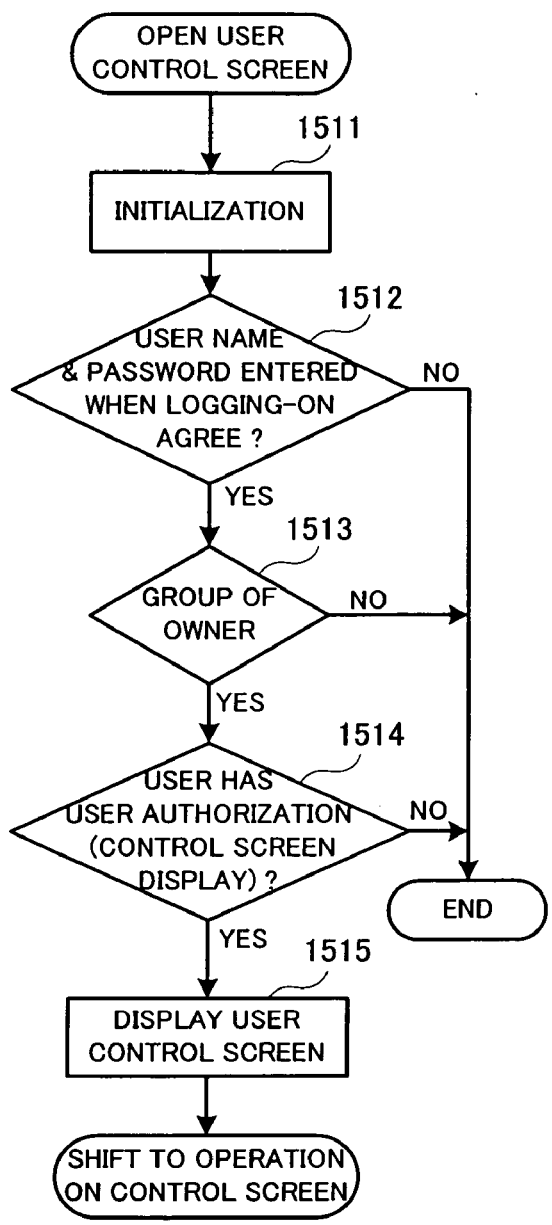
FIG. 15A
FIG. 15B

USER MANAGEMENT METHOD, AND COMPUTER PROGRAM HAVING USER AUTHORIZATION MANAGEMENT FUNCTION

BACKGROUND OF THE INVENTION

The present invention relates to a user management method for managing user authorization for using various apparatus and software, and a computer program having a user authorization management function.

There have been known digital mixers of which "mixer construction" can be custom-made as disclosed in "Operation Manual for DME32 DIGITAL MIXING ENGINE", Yamaha Corporation, 2001. In the disclosed digital mixer, a sound signal processing section is constructed using a processor (e.g., digital signal processor device or DSP) capable of operating in accordance with a program, and the sound signal processing section can process sound signals on the basis of a mixer construction created/edited using an external personal computer (hereinafter also referred to also as a "PC"). The creation/edition, via the PC, of the mixer construction is performed in accordance with a dedicated mixer control program. Namely, the dedicated mixer control program is executed on the PC to display a mixer editing screen, and components that function as constituent elements for performing signal processing are positioned on the mixer editing screen. On the mixer editing screen, the thus-positioned components are connected, via connecting lines, to define input/output relationships, so as to create/edit a mixer construction. The thus-created/edited mixer construction is transferred from the PC to the digital mixer, and the digital mixer in turn executes the mixer construction to implement behavior based on the mixer construction. Further, on an online mode, the mixer control program run on the PC and the digital mixer are synchronized with each other, so that the digital mixer can be controlled in real time by the mixer control program run on the PC.

Examples of the above-mentioned components include preset components (hereinafter referred to as "P components") and custom components (hereinafter referred to as "C components"). The P components are each a fundamental unit of a constituent element of the mixer construction, and each of the C components comprises a combination of a plurality of P components so that the combination can be handled as a single component. Such C components can be created/edited as desired by a user having predetermined authorization.

With such a mixer control program, it is possible to define user authorization per user using the program and define a range of editable settings per defined user authorization. Normally, a user name (e.g., Administrator) having a highest hierarchical position (or rank) and granted administrator authorization is pre-defined, and thus, any user, having purchased a mixer engine, initially logs on to the mixer control program using the pre-defined user name (e.g., Administrator), then appropriately registers one or more user names of his or her own, and then freely sets user authorization for the individual registered user names.

Some "suppliers" (such as makers of software mixers, suppliers of mixer constructions, parameters etc.) create and sell mixer constructions. If the highest user authorization is granted to a user name of a given user having purchased a mixer construction created by such a supplier, then the given user can see all of supplier's know-how applied to the mixer construction, in which case the mixer constructions and related parameters can not be protected as know-how. In cases where a supplier creates and sells C components, similar inconveniences would be encountered; that is, any interested user can freely see a construction and parameters of the C components. In some cases, suppliers may want to hide, from users, details of the entire constructions and parameters of the mixer constructions and C components sold by the suppliers.

The aforementioned are problems commons to cases where an additional function is to be incorporated into a system having a given fundamental function. In connection with the cases where an additional function is incorporated in a system, a scheme has been known, in accordance with which, when a user has made a request to use the additional function, the user is requested to enter a password etc. for using the additional function; with the scheme, however, there is a risk of the protection of the creator's (or supplier's) know-how being undesirably broken by the user attempting password entry many times (e.g., entering many possible passwords one after another).

Also known are software and systems that are usable by users obtaining predetermined user authorization. In the field of ordinary operating systems (OSs) and databases, there has been known a scheme in which each individual user is grouped when an account of the user is to be created, and, when the user has logged in or on by entering a user name and password on a log-in screen, the user is granted use authorization (for using desired software or system) corresponding to the group the user belongs to. Normally, there is set a special user or group called "Administrator" which has authorization to perform all operation. This Administrator adds a new user, changes authorization of an existing user, deletes an existing user, and performs management of passwords. Also known is a scheme which divides users into groups and sets a special user having sub-administrator authorization capable of performing user management per group (Japanese Patent Application Laid-open Publication No. HEI-11-298514).

With the aforesaid conventionally-known digital mixers and mixer control programs, it is possible to define authorization of each individual user and define a permissible range of use and edit for each user authorization. Because a user name (e.g., Administrator) having highest administrator authorization is pre-defined, any user, having purchased a mixer engine, initially logs on to the mixer control program using the pre-defined user name (e.g., Administrator), then appropriately registers one or more user names of his or her own and then freely sets user authorization for the individual registered user names, as noted above. Management of such user's use authorization is performed in a similar manner to the aforementioned use authorization management in OSs etc.

Further, the aforesaid digital mixers and mixer control programs include not a few data and functions for which authorization settings are to be made per user group, in a similar manner to the aforementioned technique applied to OSs etc. In such a case, it suffices to create user groups and give each of the groups authorization concerning the data and functions. However, there is a need to explicitly create user groups and define authorization for each of the groups, which would require cumbersome and laborious operations. Besides, no sub-group can be created in the groups. The technique disclosed in "Operation Manual for DME32 DIGITAL MIXING ENGINE" identified above can set a sub-administrator capable of performing user management per user group, but setting such a sub-administrator too would involve cumbersome and laborious operation.

SUMMARY OF THE INVENTION

In view of the foregoing, it is an object of the present invention to provide a protection technique which, where a supplier or the like supplies an additional function to a system having various functions, such as a mixer control program for controlling a digital mixer that processes sound signals, can reliably protect know-how of a program or data of the additional function (for example, mixer construction, custom (C) components, etc. in the case of a digital mixer) supplied by the supplier and minimize a possibility of the protection being broken by an ill-intentioned or malicious user.

It is another object of the present invention to provide a technique which, in managing authorization of users using various apparatus and software, such as the above-mentioned digital mixer and mixer control program for controlling the digital mixer, allows authorization of a plurality of users to be managed in a simple and easy-to-understand manner and also allows minute use authorization to be set when necessary.

In order to accomplish one of the above-mentioned objects, the present invention is characterized by also using information, entered by a user at the time of logging on (or logging in), in a check to be performed in response to a request for using/editing a program or data related to an additional function. Authentication information of each user using the program or data related to the additional function is included in advance in the program or data related to the additional function, so that, when a particular user has made a request for using/editing of the program or data, it is checked whether or not the particular user is a user authorized to use the additional function, using the information entered by the user at the time of logging on and the authentication information. Namely, the information, such as the user ID and password entered by the user at the time of logging on, is included in advance in the program or data related to the additional function, and, when the user has made a request for use/edit of the additional function, the present invention ascertains whether or not the user ID and password entered by the user at the time of logging on agree with the user ID and password previously included in the program or data related to the additional function.

If detailed contents of a protection are to be set for the additional function, the contents of the protection are included in advance in the program or data related to the additional function, and, when the user has made a request for the additional function, authorization is granted to the user in accordance with the contents of the protection.

In order for a supplier (or the like) to log on and freely use/edit an additional function supplied thereby, the supplier must be registered as a user of the system; for that purpose, it is only necessary that the supplier have its user ID registered by an Administrator of the system. After that, the supplier can freely use/edit the additional function if the supplier only logs on to change the password and then again logs on. Following that, it is only necessary that the supplier's user ID be deleted.

According to the present invention, information, entered by a given user at the time of logging on (or logging in), is also used in a check to be performed in response to a request for use/edit of a program or data related to an additional function, as stated above. Thus, when an ill-intentioned or malicious user tries to break the protection of the additional function, the malicious user has to seek a way, by trial and error, to use/edit the additional function while redoing logging-on operation many times. Because such operation is laborious and troublesome, the present invention can achieve the benefit that the protection of the program or data is very difficult to break. If the supplier or the like wants to freely use/edit an additional function supplied thereby, it can do so by only including its own authentication information in a program or data related to the additional information and entering the authentication information at the time of logging on. With such arrangements, the present invention can realize an excellent protection technique to reliably protect the know-how of the additional function.

In order to accomplish the other object, the present invention, which is applied to user management for creating an account of a user using an apparatus or software and setting authorization of a user in using the apparatus or software, characterized in that a plurality of users have parent-child relationships with a highest-position (or rank) root user at the top and a hierarchical structure of the users is visually displayed. Particular user in the hierarchical structure (e.g., second-position user) forms a group with its subordinate users (i.e., users lower in hierarchical position than the particular user). Each of the users is set at a lower user level than another user immediately above that user. Further, data created by a user belonging to a given group is set as data (i.e., possession) of the given group, and no user belonging to another group is allowed to use the data.

Further, the account of a subordinate user of an owner of each of the groups can be edited not only by the root user but also by the owner. Furthermore, a user higher in hierarchical position (or rank) than the owner is allowed to set the account of each of its subordinate users; however, the user higher in hierarchical position than the owner dose not form a group. Data stored as a possession of a given user higher in hierarchical position than the owner is made usable by a user of a group lower than that of the given user.

According to the present invention, the tree-like hierarchical structure is managed in such a manner that users of lower positions in the hierarchy have lower authorization. In the tree-like hierarchical structure, each owner and its subordinate users together form a group. Data created by a user of any one of the groups is automatically protected so that users belonging to the other groups are prevented from using the data. By viewing the tree of the hierarchical structure visually displayed on a display device or the like, it is possible to identify, at a glance, states of grouping, of the plurality of users, into a plurality of groups and hierarchical relationships among the users. Therefore, the present invention can greatly facilitate management and confirmation of the user accounts and enhance the usability of a computer on which the control program runs.

Further, the owner of each of the groups can freely manage the user accounts of the group it belongs to, without requesting the root user. Even in the case where the owner of each of the groups freely manages the user accounts of the group, the hierarchical structure of the user accounts can be maintained.

Furthermore, users higher in hierarchical position than the owners of the plurality of groups can each manage the user accounts of two or more groups subordinate to the user. By setting given data as a possession of any one of the higher-position users, the given data can be made usable by users belonging to any one of the two or more subordinate groups.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which:

FIG. 4 is a diagram showing example structures of various data in a mixer engine;

FIGS. 5A and 5B are diagrams showing a log-on screen and fundamental screen;

FIGS. 8A and 8B are diagrams showing user control screens;

FIGS. 10A and 10B are diagrams showing examples of specific displayed contents in the security setting dialogue;

FIGS. 15A and 15B are flow charts of processing executed in response to an instruction for opening a construction screen of a C component, processing executed in response to an instruction for opening a user control screen, and processing executed in response to an instruction for changing a parameter on a user control screen.

DETAILED DESCRIPTION OF THE INVENTION

Figure 1:
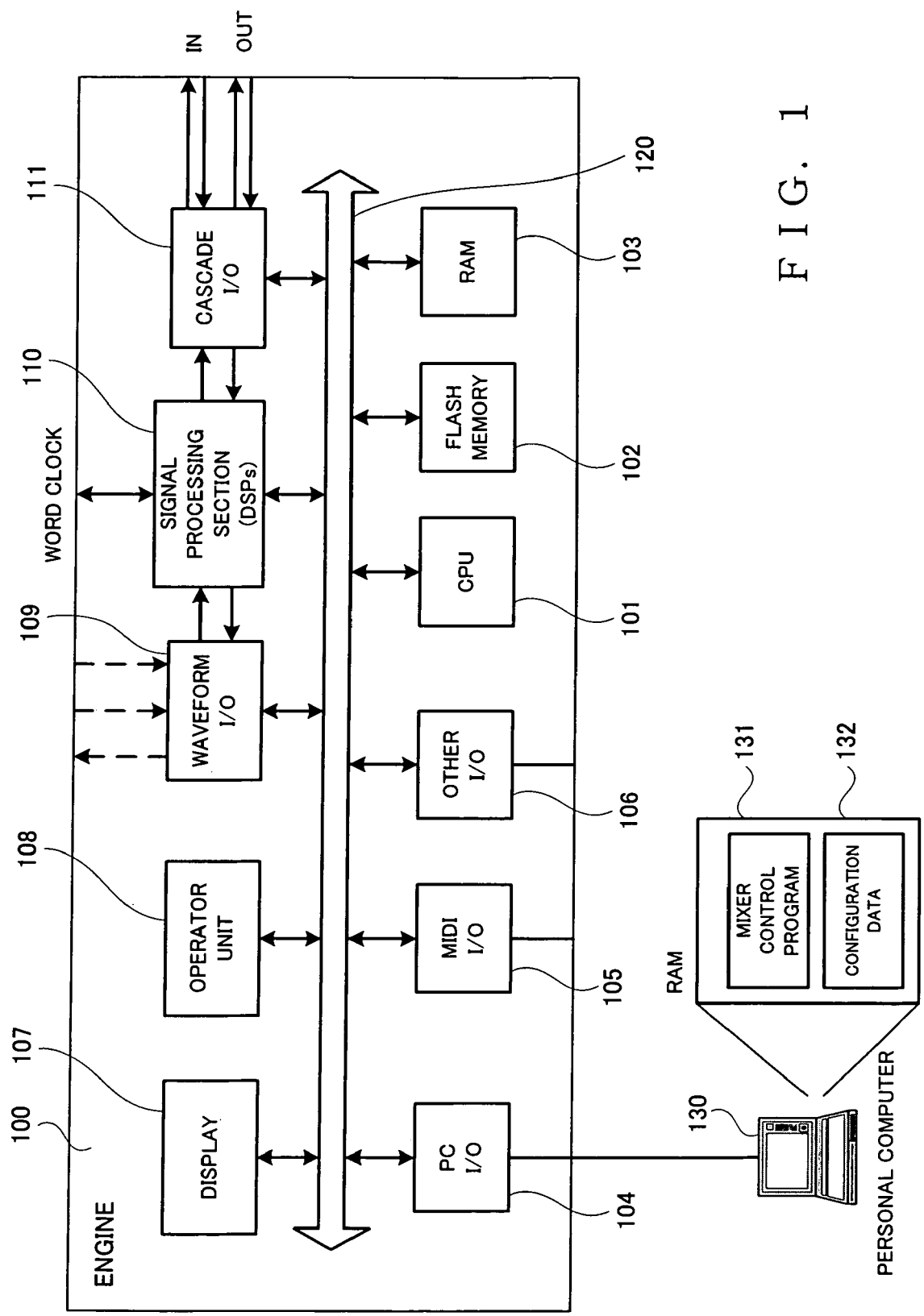
FIG. 1 is a block diagram showing an example general setup of an engine of a digital mixer in accordance with an embodiment of the present invention.

FIG. 1 is a block diagram showing an example general setup of an engine of a digital mixer in accordance with an embodiment of the present invention. The engine 100 includes a central processing unit (CPU) 101, a flash memory 102, a RAM (Random Access Memory) 103, a PC input interface (I/O) 104, a MIDI I/O 105, other I/O 106, a display 107, an operator unit 108, a waveform I/O 109, a signal processing section (group of DSPs) 110, a cascade I/O 111, and a system bus 120.

The central processing unit (CPU) 101 is a processing device for controlling behavior of the entire digital mixer. The flash memory 102 is a non-volatile memory having stored therein various programs and data to be used by the CPU 101 and DSPs etc. of the signal processing section 110. The RAM 103 is a volatile memory for use as a loading area of a program to be executed by the CPU 101 and as a working area. The PC I/O 104 is an interface (e.g., LAN, USB, serial I/O and/or the like) for connecting an external PC (personal computer) to the digital mixer of the present invention. The MIDI I/O 105 is an interface for connecting any one of various MIDI equipment to the digital mixer of the present invention. The other I/O 106 is an interface for connecting any one of various other equipment to the digital mixer of the present invention. The display 107 is provided on an outside panel of the mixer to display various information. The operator unit 8 includes various operators provided on the outside panel for operation by a user. The waveform I/O 109 is an interface for communicating sound signals with external equipment, and it performs various functions, such as: an A/D (Analog-To-Digital) conversion function for receiving and converting an analog sound signal into a digital sound signal and passing the converted digital sound signal to the signal processing section 110; a digital signal input function for receiving a digital sound signal and passing the received digital sound signal to the signal processing section 110; and a D/A (Digital-To-Analog) conversion function for receiving and converting a digital sound signal, output from the signal processing section 110, into an analog sound signal and passing the converted analog sound signal to a sound system. The signal processing section 110 comprises several DSPs (Digital Signal Processors), and these DSPs execute various microprograms on the basis of instructions given from the CPU 101 to thereby perform mixing processing, effect impartment processing, sound volume level control processing on waveform signals input via the waveform I/O 109, and they output the thus-processed waveform signals via the waveform I/O 109. The cascade I/O 111 is an interface for cascade-connecting the digital mixer of the present invention with another digital mixer. Such cascade-connection can increase the number of input/output channels and processing capability of the DSPs.

With the engine 100 of the digital mixer of the present invention, it is possible to custom-make a mixer construction to be implemented by the signal processing section 110. Mixer construction can be created/edited on a screen of the external PC 130 in accordance with a predetermined mixer control program 131 running on the PC 130. Combination of a plurality of thus-created mixer constructions will hereinafter be referred to simply as a "configuration", and data indicative of each individual mixer construction in the combination will hereinafter be referred to as "configuration data" (CF data sets 1–N). In response to instructing operation by the user on the screen, the mixer control program 131 generates a "configuration" as "configuration data" 132 in a memory. The configuration data 132 can be stored as a file in a desired storage device writable via the PC 130. Each mixer construction comprising configuration data stored in the storage device, such as a memory or hard disk of the PC 130, can be transferred to the engine 100 after being compiled (i.e., converted into information interpretable by the engine 100). The engine 100 can store the configuration data, transferred from the PC 130, into the flash memory 102. In response to designation, as a current mixer construction, one of the mixer constructions stored in the flash memory 102, the engine 100 operates on the basis of the designated mixer construction so that a mixer defined by the designated mixer construction can be implemented.

The mixer control program 131 has an online mode and offline mode as its operation modes. The user can switch between these online and offline modes, by performing predetermined operation. The offline mode is an operation mode in which configuration data are created/edited by the PC 130 alone, while the online mode is an operation mode in which the engine 100 is controlled in real time by the mixer control program 131 of the PC 130. When the operation mode has been designated, (compiled) configuration data currently developed in a RAM of the PC 130 are transferred to the engine 100 for storage in the flash memory 102 of the engine 100. In this way, the configuration data in the PC 130 and configuration data in the engine 100 agree with each other. Also, various states (such as parameter settings) of the mixer construction designated as the current mixer construction are transferred to the engine 100 so that the PC 130 and engine 100 are brought to a completely-synchronized state, and thus, the engine 100 can be controlled via the PC 130. If a component displayed on a mixer construction screen of the PC 130 includes a fader or if a control screen of a given component includes a fader, user's operation, via a mouse, of the fader is reflected in real time in the engine 100 as long as the operation mode is the online mode; however, when the operation mode is the offline mode, a construction and line-connection of the component can not be changed via the PC 130. Changing the construction or connection of the component will automatically switch the operation mode to the offline mode.

The user who wants to create/edit given configuration data via the PC 130 is not always an end user and may sometimes be a supplier (such as a maker of a software mixer or a supplier of a mixer construction, parameter or the like). For example, a supplier may go to an exhibition hall where the mixer is installed, connect the PC 130 to the installed mixer to create/edit configuration data of a mixer construction suitable for the exhibition hall, and then store the created/edited configuration data etc. into the flash memory 102. In this case, the mixer may be of a non-programmable type; namely, the mixer may be arranged in such a manner that each end user of the mixer is not allowed or authorized to create/edit the mixer construction represented by the configuration data and can only call and use the mixer construction created by the supplier. Because the end user can read out the configuration data from the flash memory 102 and cause the mixer to operate as a mixer of the mixer construction composed of the configuration data, there is no need to connect the PC 130 to the mixer, although the PC 130 may of course be connected to the mixer to control the mixer through operation via the PC 130 in the online mode.

Specifically, the creation/editing of the mixer construction based on the mixer program 131 is performed by positioning preset components (hereinafter referred to as "P components") and custom components (hereinafter referred to as "C components") and putting connecting lines between these components. Thus connecting, by the connecting lines, between these components is equivalent to defining signal input/output relationships between the components. These P and C components will be generically referred to simply as "components". The P component is a component block prepared by the maker as a fundamental unit of the mixer construction; P components are provided separately for individual audio processors, such as auto mixers, compressors, effecters and crossovers, and for individual parts, such as faders, switches, panning parts and meters. The C (custom) component is a component created/edited by the user and comprises a combination of a plurality of P components or C components.

Figure 2A:
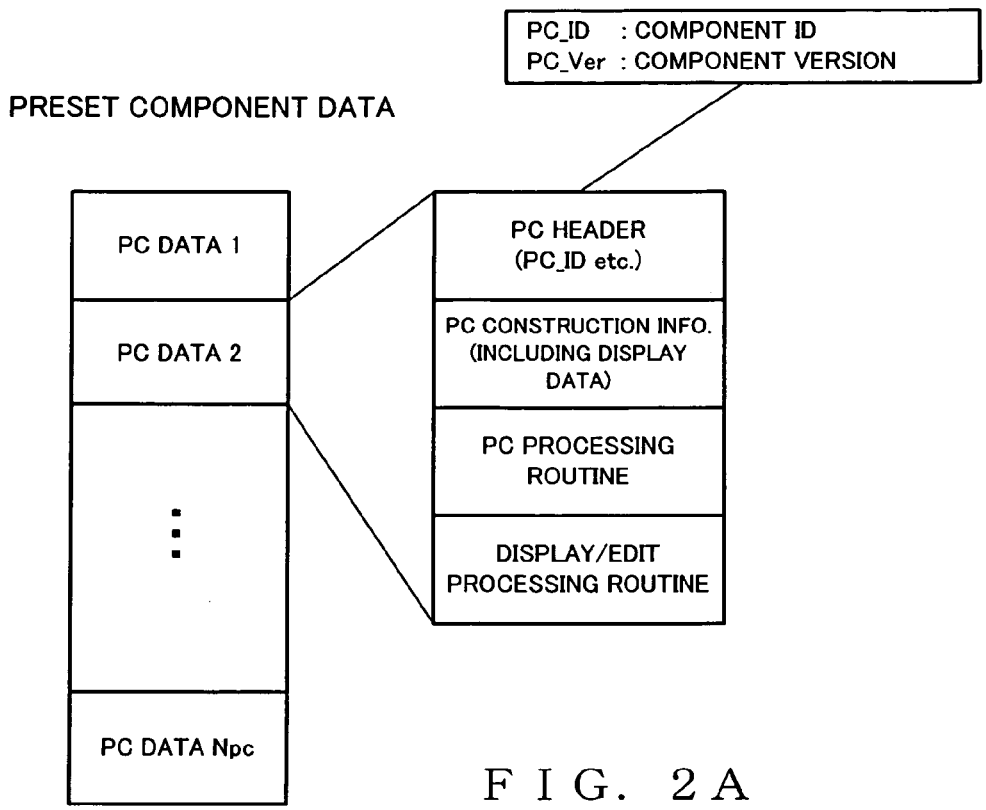
FIGS. 2A and 2B are diagrams showing example structures of various data in a PC.

FIG. 2A shows an example structure or format of P component data sets (PC data sets) to be used by the mixer control program 131 of the PC 130. Each of the PC data sets is definition data defining one P component, which is prestored in a given storage means accessible by the mixer control program 131. Such a PC data set is prestored for each type of P component. Let it be assumed here that there are Npc (indicative of an arbitrary number greater than two) types of P components. PC component set version is assigned to every one of the PC data sets. Each of the PC data sets comprises a PC header, PC construction information, a PC processing routine and a display/edit processing routine. The PC header includes a P component ID (PC_ID) and P component version (PC_Ver), and the PC data set can be identified by these P component ID (PC_ID) and P component version (PC_Ver). The PC construction information is indicative of what constituent elements the P component is composed of, as well as order of the constituent elements. The PC construction information includes display data, such as those of a control screen, of the P component. The "constituent element" refers to a part that constitutes the P component, Further, the PC construction information includes parameter item arrangement information for each of the constituent elements constituting that P component (e.g., arrangement information indicating which one of data formats: a single value format; one-dimensional arrangement format; and two-dimensional arrangement format, the parameter of the constituent element in question is in, and a data size of the constituent element). The PC processing routine is a program for performing various processing concerning the PC construction information. When the mixer control program 131 should process a mixer construction, it uses the PC processing routine of each individual P component. The display/edit processing routine is a group of programs to be used for creating/editing CF data to be later described.

Figure 2B:
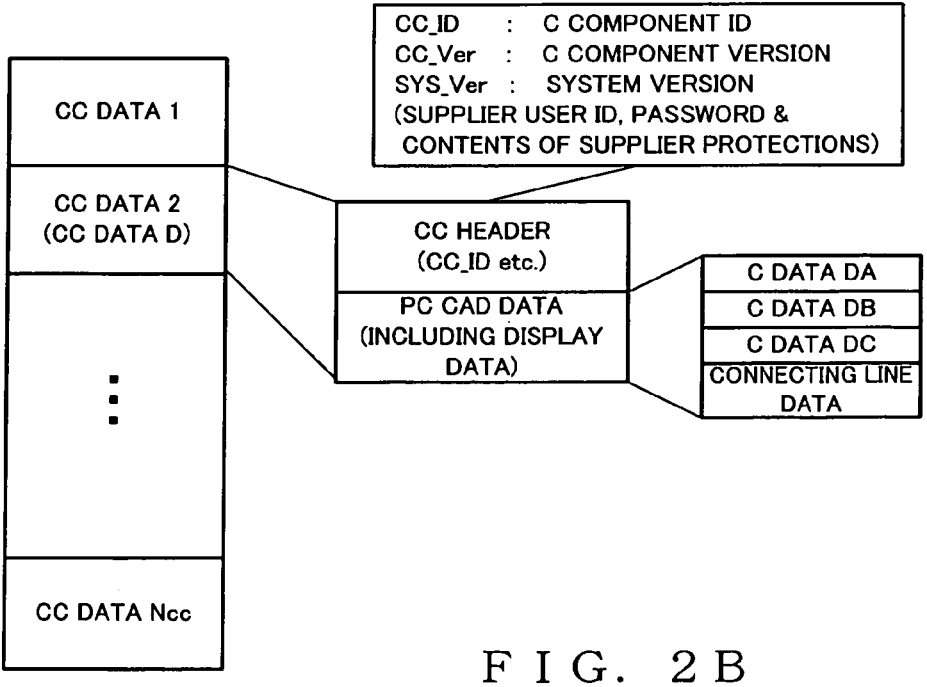

FIG. 2B shows a structure of C component data sets (CC data sets) to be used by the mixer control data 131 of the PC 130. Each of the CC data sets is a definition data set defining a C component, which comprises a CC header and CAD data for a PC (hereinafter referred to as "PC CAD data"). The CC header includes a CC component ID (CC_ID), C component version (CC_Ver) and system version (SYS_Ver). The CC data set can be identified by these C component ID (CC_ID) and C component version (CC_Ver). The PC CAD data in each of the CC data sets are data defining what kinds of components the C component in question is composed of and how these components are connected to make up the C component. Specifically, the CAD data comprise C data designating P and C components and data connecting between these components. Also, the PC CAD data in each of the CC data sets include display data, such as a C component construction screen of FIG. 7 to be later described in detail. The CC data set may also include data of a user control screen created for the C component in question.

The C component data sets shown in FIG. 2B can each be created/edited by a user having predetermined authorization and then stored in a predetermined storage device. Each CC data set can be installed in the PC 130 in accordance with a predetermined installation procedure (e.g., including copying files of the CC data). Particularly, where a supplier supplies CC data, the user ID and password (that are never informed to end users) of the supplier and, if necessary, contents of supplier protections, are stored in encrypted form, because the supplier may not want end users to view some portions of the construction and parameter settings of the CC data and/or edit these portions. When display/edit of a construction indicated by PC CAD data of the CC data has been instructed, a determination is made whether or not a logged-on user has logged on by entering the user ID and password of the supplier, and, if determined in the negative, the display/edit of the CC data construction screen is not permitted. In CC data created by an end user itself or even in CC data supplied by a supplier, which an end user has been authorized to freely use, the supplier's user ID and password are not included in the CC header; thus, fundamentally, any interested end user has authorization to use the CC data. There may be prestored, in a field for contents of supplier's protections, information indicative of partial authorization or partial inhibition to be applied to a user other than the supplier user who has supplied the CC data set, so that the user other than the supplier user is partially authorized to display/edit the CC data or partially inhibited from displaying/editing the CC data. Details of a control scheme for allowing only a supplier to manipulate CC data supplied thereby will be later described in detail.

Figure 3:
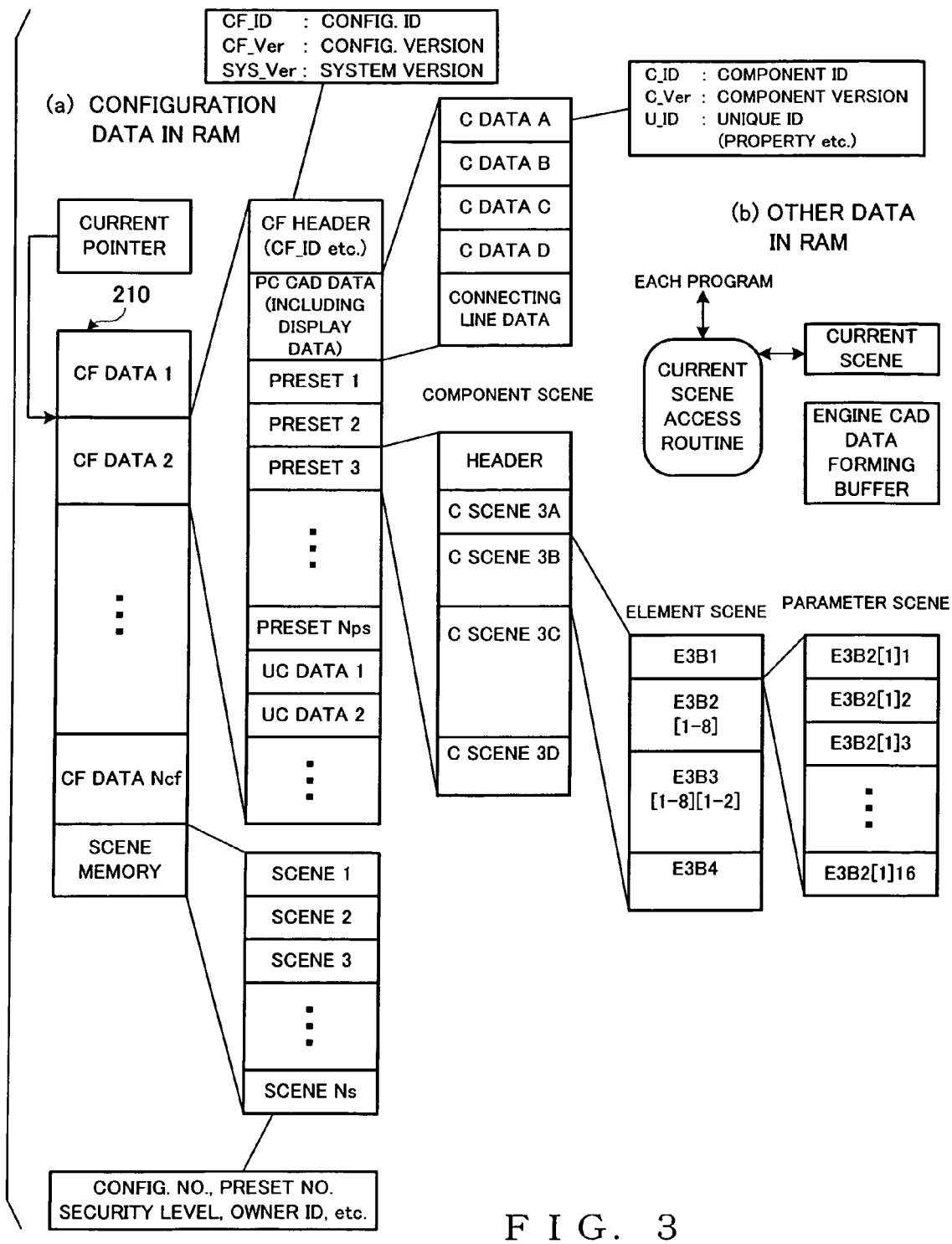
FIG. 3 is a diagram showing example structures of various data in a memory of the PC.

(a) of FIG. 3 shows an example structure of configuration data in the RAM which are to be processed on the PC 130 in accordance with the mixer control program 131. Reference numeral 210 represents the configuration data developed in the RAM, which comprise a plurality of CF data set (CF Data 1—CF Data Ncf) and a scene memory. The whole of the configuration data 210 can be stored, as a file, in a desired storage device, such as a hard disk within the PC 130. Conversely, configuration data read out from a desired storage device can be developed in the RAM of the PC 130 in a similar manner to the configuration data 210. The numbers 1—Ncf of CF Data 1—CF Data Ncf will hereinafter be referred to as "configuration numbers" (or CF numbers). Desired CF data set (or a storage area where the desired CF data set is stored) can be designated by its configuration number. Current pointer points to a CF data set to be processed. The CF data set pointed to by the current pointer is displayed on the mixer construction screen to be later described in relation to FIG. 6; the CF data set currently pointed to by the current pointer will hereinafter be referred to as a "current configuration".

Each of the CF data sets is a definition data set defining one mixer construction, which comprises a CF header, PC CAD data, Npc (indicative of an arbitrary number) presets and a predetermined number of UC data (i.e., user control screen data). The CF header includes a configuration ID (CF_ID), configuration version (CF_Ver), system version (SYS_Ver), etc. The CF data set can be identified by these configuration ID (CF_ID) and configuration version (CF_Ver). The PC CAD data in each of the CF data sets are data defining what kinds of components the mixer construction represented by the CF data set is composed of and how these components are connected to make up the mixer construction. Specifically, the CAD data comprise C data designating P and C components to be used as constituent elements of the mixer construction, and data connecting between these components. Also, the PC CAD data include display data of the mixer construction screen of FIG. 6 to be later described. Each of the C data in the PC CAD data includes a component ID (C_ID) and component version (C_Ver) designating a P component or C component, unique ID (U_ID), and other data, such as property data. The component ID (C_ID) and component version (C_Ver) designate the PC_ID and PC_Ver of a PC data set of FIG. 2A to thereby identify a P component, or designates the CC_ID and CC_Ver of a CC data set of FIG. 2B to thereby identify a C component.

Next, the presets in the CF data set will be described. Each of the CF data sets includes a desired plurality of presets. The plurality of presets will hereinafter be collectively referred to as a "library" of the CF data set. The numbers 1—Nps of Presets 1—Nps will hereinafter be referred to as "preset numbers". Desired one of the presets in the CF data set (or a storage area where the desired preset is stored) can be designated by its preset number. The presets each indicate a combination of specific parameter values to be used in the mixer construction defined by the PC CAD data of the CF data set to which the presets belong. One mixer construction is defined by the PC CAD data, but, in order for the digital mixer to actually operate with the mixer construction, it is necessary to set predetermined parameters per component; it is necessary to set input and output levels etc, for an auto mixer, level parameter values for a fader, and so on. Namely, the presets are each data set of parameter values to be used when the corresponding component should actually operate.

Each of the presets includes a header and a desired number of C (component) scenes. Portions of the preset, representing C scenes, will hereinafter be referred to as a "parameter data set". Positional arrangement of the C scenes, constituting a parameter data set, corresponds to the positional arrangement of the C data in the PC CAD data. In the illustrated example of FIG. 3, parameters of a component specified by C data A represent a C scene 3A, parameters of a component specified by C data B represent a C scene 3B, and so on. Each of the C scenes comprises a sequence of element scenes, and each of the element scenes comprises a sequence of parameter scenes. The header of the preset indicates a data structure of the parameter data set following the header.

Next, the UC data set will be described. Each of the UC data, which defines a user control screen, can be created/edited as desired by a user having predetermined authorization and stored in a CF data set. Each UC data set supplied by a supplier can be incorporated into a CF data set in the PC 130 in accordance with a predetermined installation procedure (e.g., including copying of UCC data files). Where a supplier supplies UC data, there may be one type of user control screen supplied by the supplier only for subsequent use by the supplier alone and another type of user control screen containing parameters which are displayed on the screen but which the supplier does not want any end user to alter, as in the case of the above-described CC data. Thus, as in the case of the above-described CC data shown in FIG. 2B, UC data supplied by a supplier have prestored therein, in encrypted form, the user ID and password of the supplier and, if necessary, contents of supplier protections. When display/edit of the user control screen of the UC data has been instructed, a determination is made whether or not a logged-on user has logged on by entering the user ID and password of the supplier, and, if determined in the negative, the display/edit of the UC data construction screen is not permitted. UC data created by an end user itself, or even UC data supplied by a supplier and for which an end user has been authorized to freely use, the supplier user ID and password are not included in the UC header, so that, fundamentally, the end user has authorization to use the UC data. There may be prestored, in a field for contents of supplier protections, information indicative of partial authorization or partial inhibition to be applied to a user other than the supplier user supplying the UC data, so that the user other than the supplier user is partially authorized to display and edit the UC data. Details of a control scheme for allowing only a supplier to manipulate UC data supplied thereby will be later described in detail.

Next, the scene memory will be described. Ns (Ns represents an arbitrary number) scenes, Scene 1—Scene Ns, are stored in the scene memory; the numbers 1—Ns will hereinafter be referred to as scene numbers. With the scene number, it is possible to specify a storage area where one of the scenes is stored, or one of the scenes stored in the storage area. Each of the scenes includes a configuration number, preset number, security level, owner ID, etc. The user can call (i.e., recall) a desired one of the scenes by designating the corresponding scene number. Once a recall of a desired one of the scenes is instructed, the current pointer is set so that the CF data set of the configuration number corresponding to the desired scene becomes the current configuration, the CF data are displayed on the later-described mixer construction screen (FIG. 6), and the preset of the preset number corresponding to the scene is read out and set as a current scene as will be later described in (b) of FIG. 3. Conversely, the user can store the current configuration and current scene into the scene memory by designating the scene number ("scene storage"). The above-mentioned security level and owner ID will be explained in detail with reference to FIG. 12.

(b) of FIG. 3 shows a structure of other data in the RAM which are to be processed on the PC 130 in accordance with the mixer control program 131. The current scene shows a parameter data set established in the mixer of the current configuration, i.e. current parameter values of individual components of the current configuration. Access routine of the current scene is a method providing a function for accessing the current scene. Buffer for forming engine CAD data is a buffer for generating engine CAD data from PC CAD data.

(a) of FIG. 4 shows a part of a structure of P component data (PC data) prestored in the flash memory 102 within the mixer engine 100. Because the PC data stored in the mixer engine 100 are almost the same as the PC data in the PC described above in relation to FIG. 2A, the explanation related to FIG. 2A can apply as-is here, and thus, (a) of FIG. 4 shows only portions different from FIG. 2A. Namely, in the engine 100, the display/edit routine of FIG. 2A is replaced with PC microprograms shown in (a) of FIG. 4. With the engine 100, it is not possible to display a mixer construction screen and control screen, and thus, no display/edit routine for displaying/editing screens is necessary; instead, with the engine 100, it is necessary to form microprograms corresponding to a mixer construction of engine CAD data and send the thus-formed microprograms to the DSP group, and therefore, there is a need for PC microprograms corresponding to various components as illustrated in (a) of FIG. 4. It is assumed here that there are prepared in advance all PC microprograms corresponding to various possible numbers of inputs and outputs. Although not specifically shown, it is also assumed that the PC processing routine comprises a variety of programs for processing various construction information in the engine 100.

(b) of FIG. 4 shows some of configuration data in the flash memory 102 within the mixer engine 100. Because the configuration data stored in the mixer engine 100 are almost the same as the configuration data in the PC described above in relation to section (a) of FIG. 3, the explanation related to section (a) of FIG. 3 can apply as-is here, and thus, (b) of FIG. 4 shows only portions different from (a) of FIG. 3. Namely, in the engine 100, the PC CAD data of section (a) of FIG. 3 are replaced with engine CAD data shown in (b) of FIG. 4. The engine CAD data are similar to the PC CAD data in that they are data indicative of a mixer construction to be displayed on the mixer construction screen, but no display data is necessary in the engine. Further, in order to minimize the data quantity, the engine CAD data include no display data and is expressed in a binary format. The engine CAD data are data generated in the engine CAD data forming buffer. The engine 100 too includes a current pointer, and a CF data set pointed to by the current pointer is a "current configuration". Further, in the engine, there is no concept of the C component, and each C component of a C-component-contained configuration data set of the PC 130 is developed, at the time of compiling, into lowest-order P components. Thus, C data in the engine CAD data shown in section (b) of FIG. 4 all indicate PC data. Further, because no user control screen can be displayed in the engine 100, the CF data in the engine 100 do not have UC data 1, 2, . . . as shown in section (a) of FIG. 3.

(c) of FIG. 4 shows other data in the RAM 103 of the engine 100. Current scene represents a parameter data set that is established in the mixer construction of the current configuration by the engine 100, and it comprises data similar to those in the current scene in the PC shown in (b) of FIG. 3. The explanation about the current scene made above in relation to (b) FIG. 3 can apply to the current scene in the engine shown in section (c) of FIG. 4. Although not specifically shown in (c) of FIG. 4, an access routine is provided for the current scene, as in the case of the current scene in the PC 130. Microprogram forming buffer is provided for forming microprograms corresponding to the mixer construction. When the current pointer has been switched to a new configuration data set, microprograms for providing a mixer construction of engine CAD data in the CF data set having been newly selected as the current configuration are developed in the microprogram forming buffer and transferred to the signal processing section 110. In this manner, the DSPs in the signal processing section 110 can implement functions of the mixer construction of the engine CAD data. Once a new current scene is read or the current scene is switched to another (or new current) scene, the new current scene is transferred to the signal processing section 110, which in turn develops the transferred current scene in a coefficient memory of the DSPs. The DSPs of the signal processing section 110 executes the transferred microprograms using coefficients stored in the coefficient memory, so that the signal processing section 110 can provide functions of the digital mixer with the mixer construction of the engine CAD data of the current configuration and with a parameter data set of the current scene.

Whereas configuration data may be stored into the flash memory 102 of the engine 100 in any desired manner as set forth above in (b) of FIG. 4, the configuration data storage is normally carried out by the PC 130 designating the online mode. Once the online mode is designated by the PC 130, individual CF data sets of the configuration data 210 in the RAM, shown in (a) of FIG. 3, are compiled and then transferred to the engine 100 along with contents of the scene memory. In turn, the engine 100 stores, into the flash memory 102, the transferred CF data and contents of the scene memory as set forth above in relation to (b) of FIG. 4. In this way, the configuration data in the PC 130 and the configuration data in the engine 100 agree with each other. Further, in the online mode, the current scene of the PC 130, shown in (b) of FIG. 3, is transferred to the engine 100 and stored into the current scene of the engine 100 shown in (c) of FIG. 4, so that the access routine is prepared. Consequently, in the online mode, the PC 130 and engine 100 can be placed in complete synchronism with each other, and thus, once the current scene in the PC 130 is switched to another scene, the scene switching is reflected in the current scene of the engine 100.

Because the flash memory 102 is non-volatile, the stored configuration data can be retained even when the engine 100 is powered off. After the configuration data have been stored in the flash memory 102, the engine 102 can by itself recall a scene by designating the corresponding scene number (so that the current mixer construction (CF data) can be switched to another mixer construction), change parameter values of the current scene and/or store the current mixer construction and current scene into the flash memory 102 by specifying a scene number.

FIG. 5A shows a log-on screen 500 first displayed as the mixer control program 131 is started up. Reference numeral 501 indicates a user name entry area, 502 a password entry area, 503 an OK button, and 504 a CANCEL button. Once the user enters the user name and password into the respective areas 501 and 502 and depresses the OK button 503, a fundamental screen 510 is displayed as will be described below.

FIG. 5B shows the log-on screen 510 first displayed when the user has properly logged on to the mixer control program 131 on the PC 130. On the fundamental screen 510, there is displayed an initial screen corresponding to connected states of the mixer engine 100. In this case, where only one engine, i.e. Engine 1, is provided, a block 511 corresponding to Engine 1 is displayed on the fundamental screen 510. Alternatively, a plurality of engines may be cascade-connected, in which case a plurality of blocks corresponding to these engines are displayed as mutually connected. Reference numeral 514 shows a right-click menu that is displayed by placing a mouse cursor on the block 511 indicative of Engine 1 and depressing the right button of the cursor. Using this right-click menu 514 or another menu displayed in an upper portion of the fundamental screen 510, it is possible to proceed with various processing pertaining to the mixer construction of the engine connected to the PC 130.

Once "Open Control Screen" is selected on the right-click menu 514, user control screens 800 and 810 as illustrated in FIGS. 8A and 8B are displayed. How many user control screens can be defined in each CF data set may be chosen as desired; in this embodiment, it is assumed that two control screens are defined in each CF data set. On a property screen of each engine that is opened by clicking on "Property" of the right-click menu 514, any one of a plurality of user control screens can be set as the control screen of that engine. Once "Open Control Screen" is selected on the right-click menu 514, the user control screen set as the control screen of the engine is opened. When "Open Construction Screen" is selected on the right-click menu 514, a mixer construction screen 600 of the engine in question is displayed as illustratively shown in FIG. 6. Further, once "Open" is selected on the right-click menu 514, either a control screen or a mixer construction screen. Which one of the control screen and the mixer construction screen should be opened is set via a property screen of the engine in question, as in the case of the user control screen. Note that the instructions given by operation via the right-click menu 514 can be given using the menu displayed on an upper portion of the fundamental screen 510. Further, when the block 511 indicative of the engine has been double-clicked, the same processes as when "Open" was selected on the right-click menu 514 are carried out.

Figure 6:
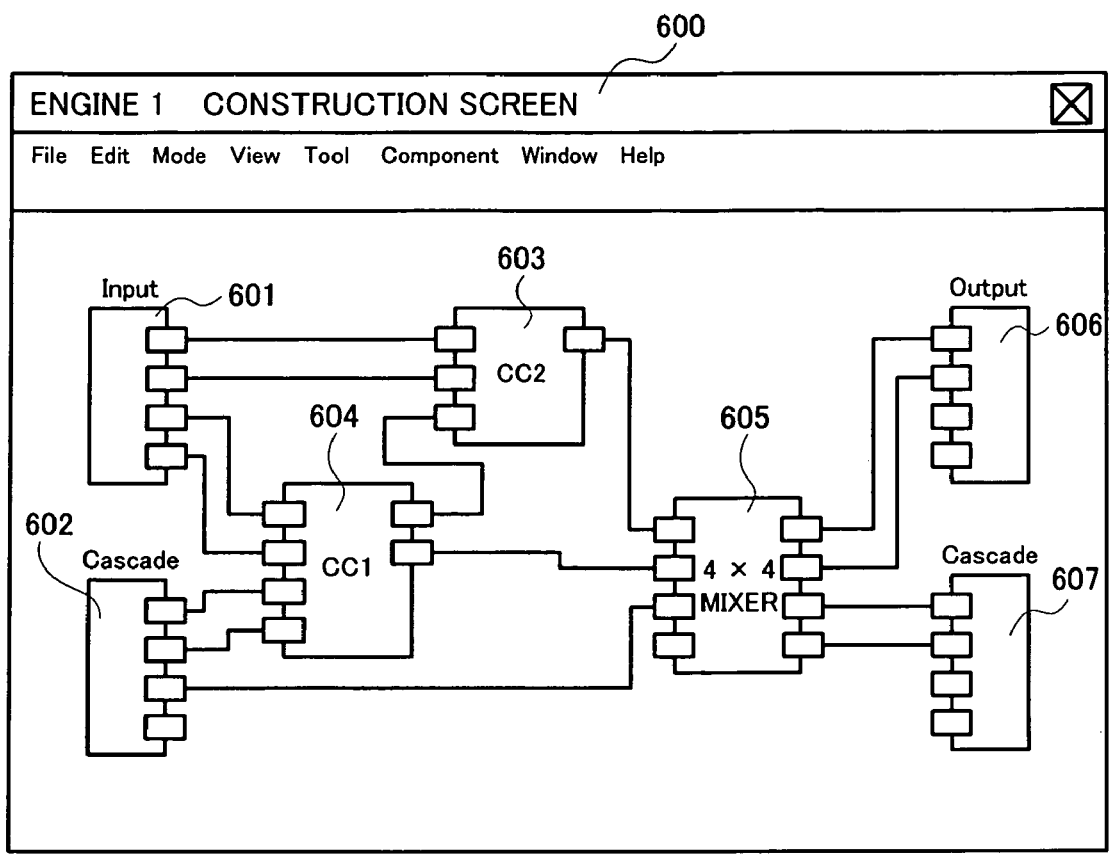
FIG. 6 is a diagram showing a mixer construction screen.

The mixer construction screen 600 of FIG. 6 is a screen showing the mixer construction represented by the CF data set (current configuration) that is currently pointed to by the current pointer in Engine 1. On the mixer construction screen 600, P or C components are displayed as mutually connected via connecting lines indicative of input and output relationships between the components, on the basis of the current configuration. Reference 601 and 606 indicate constituent elements representing input terminals and output terminals to and from Engine 1. Reference 602 and 607 indicate constituent elements representing terminals to be used when a plurality of engines are to be cascade-connected. Further, 603 and 604 indicate C components, and 605 indicates a P component. These P and C components are each a component specified by the C data of the PC CAD data of the current configuration, which corresponds to the PC data of FIG. 2A or CC data of FIG. 2B. As the mixer construction is created/edited via the mixer construction screen 600, the creation/edit is reflected in the current configuration.

Figure 7:
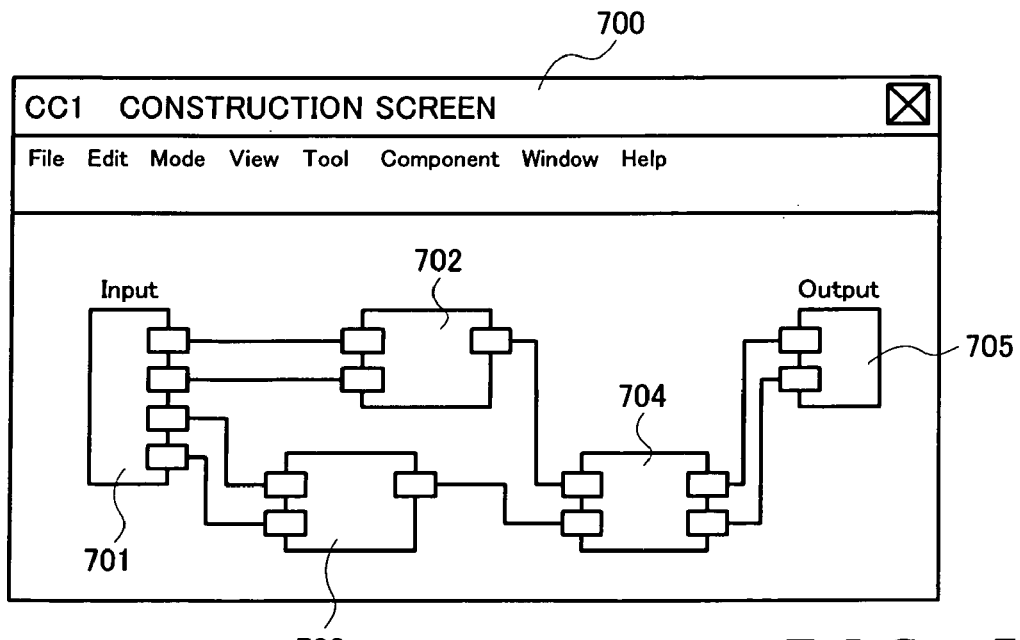
FIG. 7 is a diagram showing a C component construction screen.

Once any one of the C components 603 and 604 is right-clicked, a right-click menu similar to the right-click menu 514 of FIG. 5B is displayed, so that it is possible to open a user control screen of FIG. 8A or 8B, or a C component construction screen of FIG. 7. Right-clicking the constituent element 605 representing a P component can open a right-click menu also similar to the right-click menu 514. However, because there is no P component construction screen, there is no "Open Construction Screen" option. Further, the control screen referred to by "Open Control Screen" means a "user control screen" when the block of the engine or C component has been clicked on, but "Open Control Screen" of the right-click menu of the P component means opening a specific control screen prepared in advance for the P component by the maker (included in the PC construction information of FIG. 2A). On the control screen for the P component, there are provided operators operable to set/change values of various parameter items. As any one of these operators is operated, the parameter value, corresponding to the operator, within the current scene is changed.

C component construction screen 700 of FIG. 7 is an example screen indicative of a construction of the C component 604 illustrated in FIG. 6 (i.e., CC data having been read into a current memory within the PC 130). On the C component construction screen 700, P or C components, which are constituent elements of the C component in question, are displayed as connected to one another via connecting lines indicative of input and output relationships between the components, on the basis of the current configuration, as on the above-described mixer construction screen 600. Reference 701 and 705 indicate constituent elements representing input terminals and output terminals to and from the C component. Reference numerals 702-704 each indicate a P or C component. These P and C components are each a component specified by the C data of the PC CAD data of the CC data stored in the current memory, which corresponds to the PC data of FIG. 2A or CC data of FIG. 2B. When storage of the C component in the current memory, being created/edited on the C component construction screen, has been instructed, the CC data indicative of the currently-displayed construction of the C component can be stored into a desired storage means in the format explained above in relation to FIG. 2B and in a designated file name. Conversely, once the CC data stored in a desired storage means in the format of FIG. 2B are opened, the CC data are read into the current memory, so that the C component construction screen corresponding to the CC data can be displayed as illustrated in FIG. 7 for desired editing.

Next, a description will be made about the user control screens illustrated in FIGS. 8A and 8B. The user can create, in each CF data set, a desired number of user control screens. When an already-created (i.e., existing) user control screen is to be edited, the user, for example, selects an "Edit Mode" from a right-click menu (not shown), which appears in response to right clicking (e.g., on a background portion) of the user control screen, to thereby shift the user control screen from a normal mode to an edit mode. Then, the user performs drag and drop operation for copying operators etc., from a control screen of a P component that is a constituent element of the mixer construction or C component, onto a window of a user control screen of the edit mode, to thereby position the operators etc. on the window. Thus, the user performs various editing of, for example, a position of the window and colors, sizes, shapes etc. of the operators, to create a user control screen. For example, the user control screen 800 of FIG. 8A is created by opening the control screen of any one of the components currently displayed on the mixer construction screen of Engine 1 of FIG. 6 and then dragging and dropping, from the opened control screen, an operator 801 and displaying element 802. Similarly, the user control screen 810 of FIG. 8B is created by opening the control screen of any one of the components currently displayed on the C component construction screen of FIG. 7 and then dragging and dropping, from the control screen, a meter 811, an operator (knob) 812 and displaying element 813. Here, the copied-from source of the operator and displaying element to be positioned on the user control screen is the control screen of a P component that is a constituent element of the mixer construction of any engine of the CF data to which the user control screen belongs, or the control screen of a P component that is a constituent element of a C component positioned in the mixer construction. Copying from the control screen of a P component that is a constituent element of the mixer construction of other CF data is not permitted. Upon completion of the desired editing, the user can select the "Normal Mode" from the right-click menu (not shown), which appears in response to right clicking of the user control screen, to thereby shift the user control screen from the edit mode back to the normal mode. Note that the user control screen may be created in any other suitable manner than the above-described. When any one of the operators on the user control screen has been operated in the normal mode, the value of the parameter, corresponding to the operated operator, in the current scene is changed.

The illustrated examples of FIGS. 5-8 have been described above on the assumption that the logged-on user has authorization to perform all operation. In effect, however, the mixer 100 and mixer control program 131 of FIG. 1 assume that they are used by a plurality of users and manage use authorization of the individual users. The following paragraphs describe setting (security setting) of such use authorization.

Figure 9:
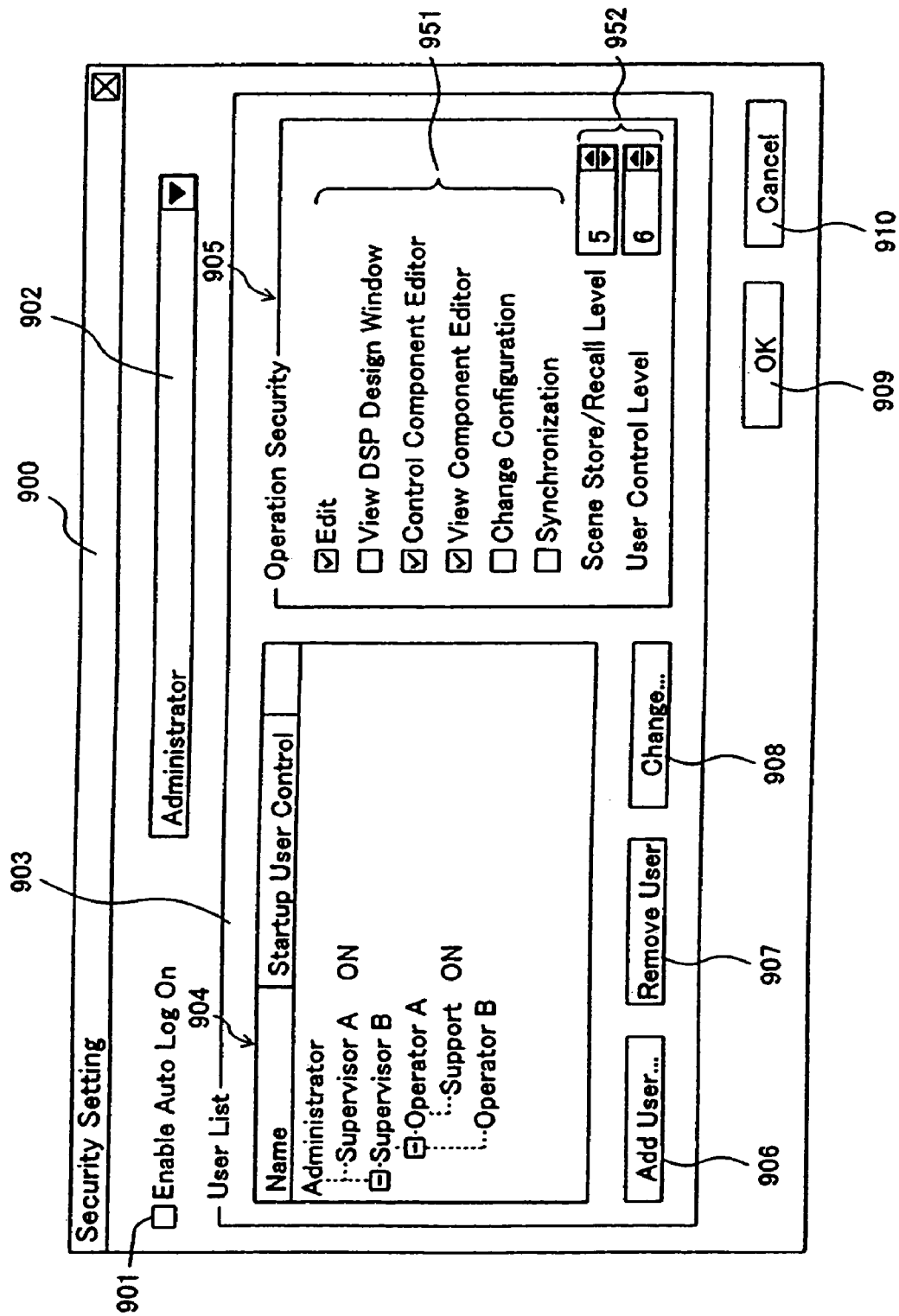
FIG. 9 is a diagram showing a security setting dialogue.

FIG. 9 shows an example screen of a security setting dialogue 900. Using this dialogue 900, it is possible to execute a user registration, change or cancel the user registration and perform security setting of an application function. The security setting dialogue 900 can be called by performing predetermined operation (e.g., menu selection on the fundamental screen 510) on the PC 130. Each user (account) of the instant system is incorporated into a hierarchical structure to be later described. Thus, in the hierarchical structure, there are higher, equal and lower hierarchical positions (or ranks) among the users. Each user of a lower hierarchical position than a given user (i.e., each user who can be traced downward from the given user) will be referred to as a "lower-position user", while each user of a higher hierarchical position than the given user (i.e., each user who can be traced upward from the given user) will be referred to as a "higher-position user". Of logged-on users, a specific user having authorization equal to or higher than an owner of a group (to be later described) can edit, through the dialogue 900, an account of a lower-position user (i.e., user lower in hierarchical position than the specific user). None of the logged-on users can create an account of a higher-position user or edit an account of the logged-on user. Note that data of the user account created through the dialogue 900 are stored into an initial setting file (not shown) of the mixer control program 131. Because the initial setting file is separate from the configuration data file, settings of the user account can not be changed even when the separate configuration data have been read.

In the security setting dialogue 900, an Enable Auto Log-On checkbox 901 is intended to switch between enabled (or operable) and disabled (inoperable) states of an auto log-on function. Checking (or turning on) the Enable Auto Log-On checkbox 901 can enable the auto log-on function, so that the user can log on without entering the password. When unchecking the box 901, a dialogue is displayed to request entry of the password of the currently-logged-on user; the purpose of this is to prevent the user from disabling the auto log-on function with the password lost or forgot, to thereby avoid the user from being placed in condition where re-log-on is not permitted. Auto Log-On User combo box 902 is a combo box for designating an auto logged-on user when the Enable Auto Log-On checkbox 901 has been turned on. "Disabled" display is made when the auto log-on function is in disabled condition. No person of a user level higher than the logged-on user can be selected.

User List view 903 is an area for displaying/editing various information of a registered user. On a User List view 904, there is displayed a hierarchical structure of a name list of currently-registered users. The highest-position user is an Administrator. Let it be assumed here that only the Administrator is registered as a user at the time of factory shipment of the instant system. Supervisor A and Supervisor B are users lower in hierarchical position than the Administrator, Operator A and Operator B are users lower in hierarchical position than Supervisor B, and Support is a user lower in hierarchical position than Operator A. The Administrator can set, as an owner of a later-described group, a desired one of the users incorporated in the hierarchical structure, by performing predetermined operation. Here, let it also be assumed that Supervisor A and Supervisor B are set as the group owners. These users thus set as the group owners can perform editing pertaining to a user lower in hierarchical position than them (logged-on user names). Once a user name is selected from among the user names displayed on the User List view 904, the thus-selected user name becomes an object of editing (object-of-editing user). The "editing" in this case includes addition of a user by an Add User button 906, deletion of a user by a Remove User button 907, change of a user name or the like by a Change button 908, ON/OFF setting of each checkbox 951 in an Operation Security area 905, setting of Scene Store/Recall Level, User Control Level 952, etc. In the hierarchical structure displayed on the User List view 904, each given user who is not traceable in the downward direction from a logged-on user set as a group owner can not be said to be lower in hierarchical position than the logged-on user, and thus, the logged-on user can not edit the account of the given user. In the illustrated example of FIG. 9, for instance, Operator B can not edit the account of the Support. Further, each given user higher in hierarchical position than the user set as a group owner can edit the account of all users who are traceable in the downward direction from the given user.

All users who are traceable in the downward direction from a given user will hereinafter be referred to as "subordinate users" of the given user. Further, in the hierarchical structure of users displayed on the User List view 904, each user set as an owner (i.e., owner user) and all of subordinate users of the owner user are defined as a "group", and the owner user becomes an owner of that group. Any other user who is traceable in the upper or lower direction from the owner user can not be set as an owner. Namely, a plurality of groups are organized in such a manner that the users of any one of the groups do not redundantly belong to any other group. Note that, on the User List view 904 of the screen of FIG. 9, each owner user of a group and members of the group are displayed distinguishably, for example, in different colors and/or by using underlines so that the owners and state of the grouping can be identified at a glance.

FIGS. 10A and 10B show example displayed details or contents of the security setting dialogue 900 of FIG. 9. In FIGS. 10A and 10B, a "User Selected by Tree" column indicates users selected, as objects of editing, via the User List view 904. "Add User button", "Remove User button" and "Change Button" columns show how the individual buttons 906-908 are displayed. "individual checkbox" column shows how the checkboxes indicated at 951 of FIG. 9 are displayed. Further, an "individual security level setting section" column shows how a security level setting section shown at 952 of FIG. 9 is displayed.

FIG. 10A shows a case where a logged-on user is Supervisor B set as an owner of a group. Here, when the Administrator or Supervisor A, who is a user equal or higher in hierarchical position than Supervisor B, has been selected, the Add User button 906, Remove User button 907 and Change Button 908 for the Administrator or Supervisor A are displayed as inoperable or disabled buttons. How the checkboxes 951 and the security level setting section 952 are currently set is displayed, but each operation displayed in a "gray-out" fashion is not permitted. When the logged-on user, Supervisor B, has selected itself, the Add User button 906 is displayed as an operable, "enabled" button, but the other buttons are displayed in a "gray-out" fashion and can not be operated. When Operator A, Operator B or Support, who is a subordinate user of Supervisor B, has been selected, each of the Add User button 906, Remove User button 907 and Change Button 908 is displayed as an "enabled" button. Although each of the checkboxes 951 is basically displayed as "enabled" and hence operable, a "X" mark is displayed in a "gray-out" fashion for each item for which no authorization has been granted to a user of a position immediately above the user set the object of editing. For example, when a View DSP Design Window item of Supervisor B is not checked, the same checkbox for Operator A (and Support) is displayed in a "gray-out" fashion by a "X" mark. Although the "security level setting" section 952 is basically displayed as "enabled" and hence operable, it can be set within a range lower than a level currently given to the user of the position immediately above the user who is the object of editing (for example, it can be set to a level value greater than that currently given to the user of the immediately-above position, i.e. "immediately-above user"). In short, for each checked item, authorization can be granted to a subordinate within a range not exceeding authorization currently granted to the immediately-above user, and, for the security level, authorization can be granted to the subordinate within a range lower than authorization currently granted to the immediately-above user but higher than authorization currently granted to an immediately-below user.

FIG. 10B shows a case where the logged-on user is the Administrator. In this case, the Remove User button 907 is displayed in a "gray-out" fashion and placed in inoperable or disabled condition so that the Administrator itself is not deleted, but the other buttons are displayed as "enabled" and placed in operable condition.

Now referring back to FIG. 9, settings that can be made/changed via the individual buttons and checkboxes will be explained.

Figure 11:
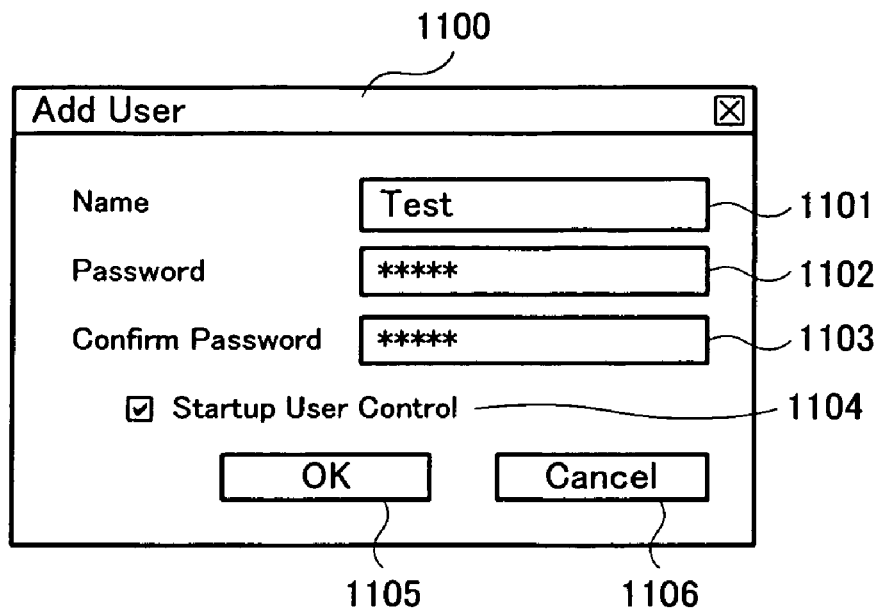
FIG. 11 is a diagram showing an Add User dialogue security setting dialogue.

Once the Add User button 906 displayed as "enabled" is clicked on, a new user can be added immediately below the user currently selected as the object of editing. FIG. 11 shows an Add User Dialogue 1100 displayed in response to clicking on the Add User button 906. Name filed 1101 is where the name of the user to be added is entered. Password field 1102 is where a password to be used by the user to be added when logging on is entered. Confirm Password field 1103 is where the user to be added is requested to again enter the password in order to avoid erroneous entry of the password. Startup User Control checkbox 1104 is for setting ON/OFF of Startup User Control of the user to be added. As regards a user for which the Startup User Control is ON, a user control screen is automatically opened when the user has logged on or switched the current configuration to another configuration. User control screens of CF data is opened only when a Security Level set therein is equal to or lower than a Control Level of the user (in terms of level values, Security Level≦User Control Level), as will be later described. When a new user is to be added, each of the checkboxes 951 is placed, as a default, in a non-checked state. Each level of the security level setting section 952 is set to a value greater by one (i.e., to a level lower by one) than a Scene Store/Recall Level and User Control Level of the object-of-editing user. In this case, a level value "10" corresponds to the lowest level, and thus, if the Scene Store/Recall Level and User Control Level of the object-of-editing user is "10", no new user can be created below the object-of-editing user, as will be later described.

Once the Remove User button 907 of FIG. 9 displayed as "enabled" is clicked on, the object-of-editing user is deleted; in this case, each subordinate user of the object-of-editing user is deleted simultaneously with the object-of-editing user. Once the Change button 908 displayed as "enabled" is clicked on, a Change User Information dialogue is opened so that the object-of-editing user can be edited. The Change User Information dialogue is similar in contents and function to the Add User Dialogue shown in FIG. 11.

Each of the checkboxes 951 in the Operation Security area 905 when in the ON (i.e., checked) state indicates that the corresponding authorization has been granted to the object-of-editing user, while each of the checkboxes 951 when in the OFF (i.e., unchecked) state indicates that the corresponding authorization has not been granted to the object-of-editing user. Specifically, an Edit checkbox is provided for turning on/off authorization for performing creation/editing of a mixer construction via the mixer construction screen of FIG. 6, creation/editing of a C component via the C component construction screen of FIG. 7, and creation/editing of a user control screen, such as the one shown in FIG. 8A or 8B. View DSP Design Window checkbox is provided for turning on/off authorization for displaying a C component construction screen or mixer construction screen, a Control Component Editor checkbox is for turning on/off authorization for setting/changing a parameter on a P component control screen or user control screen, and a View Component Editor checkbox is for turning on/off authorization for displaying these control screen. Further, a Change Configuration checkbox is provided for turning on/off authorization for switching the current configuration, i.e. current pointer, (including scene switching that involves switching of the current configuration; this checkbox is turned off when one CF data set is to be prevented from being switched to another by mistake). Further, a Synchronization checkbox is provided for turning on/off authorization for switching the mixer control program 131 and mixer engine 100 to the online mode in which configuration data and current scene of the program 131 and engine 100 operate in a mutually-synchronized relation to each other.

The Scene Store/Recall Level in the Security Level setting section 952 is intended to set, in a level value ranging from "1" to "10", authorization for storing and recalling a scene. The level value "1" indicates the strongest, highest level, while the level value "10" indicates the lowest level. As will be later detailed, a Security Level (specifically, Edit Security and Recall Security) is preset in each scene stored in the scene memory. When a logged-on user wants to store/recall a scene, the Scene Store/Recall Level of the logged-on user is compared with the Security Level of the scene to be stored/recalled. If the Scene Store/Recall Level of the logged-on user is higher than or equal to the Edit Level of the scene (in terms of the level values, Scene Store/Recall Level≦Edit Security), storage of the scene is permitted; otherwise, the storage of the scene is not permitted. Further, if the Scene Store/Recall Level of the logged-on user is higher than or equal to the Recall Level of the scene (in terms of the level values, Scene Store/Recall Level≦Edit Security), recall of the scene is permitted; otherwise, the recall of the scene is not permitted.

User Control Level is intended to set, in a level value ranging from "1" to "10", authorization for displaying (and operating) the user control screen explained above in relation to FIG. 8A or FIG. 8B. The level value "1" indicates the strongest, highest level, while the level value "10" indicates the lowest level. As will be later detailed, a Security Level is preset in each user control screen. When the logged-on user wants to display the user control screen, a comparison is made between the User Control Level of the user and Security Level of the user control screen. If the User Control Level of the logged-on user is higher than or equal to the Security Level (in terms of the level values, Control Level≦Security Level), display of the user control screen is permitted; otherwise, display of the user control screen is not permitted. No new user can be created below a user of which any one of the Scene Store/Recall Level and User Control Level has reached the lowest level value of 10. Namely, when such a user has become an object of editing, the Add User button 906 is displayed in a "gray-out" fashion. Because, as noted above, the level that can be set per user is restricted to a lower level that another user immediately above the user in question, the number of users who can be created in a downward direction from the user in question is limited in accordance with the lower of the two level values (i.e., Scene Store/Recall Level and User Control Level).

Note that the setting of the individual checkboxes 951 is given priority over the setting of the security level setting section 952. For example, irrespective of how the User Control Level has been set, no authorization for displaying a control screen is granted as long as the View Component Edit checkbox is in the OFF state.

When setting operation has been performed to turn off any one of the checkboxes 951 of a given user (i.e., invalidate predetermined authorization of the given user), and if any one of the checkboxes of a subordinate user of the given user has been turned on, the checkbox of the subordinate user is automatically turned off. Further, when setting operation has been performed to lower any one of the security levels of the security level setting section 952 of a given user to a predetermined value, and if the security level of another user immediately below the given user is equal to or higher than the predetermined value, the security level of the other user is automatically lowered to a level lower by one than the predetermined value. Further, if there is still another user immediately below the above-mentioned other or immediately-above user, then the level value of the still other user is limited to be lower than the level value of the other or immediately-above user, in a similar manner to the aforementioned. Thus, in the instant hierarchical structure of users, there is established the rule that each user has lower authorization than another user immediately above the user in question and higher authorization than another user immediately below the user in question. According to the instant hierarchical structure, performing operation to limit the authorization of a given user can simultaneously limit the authorization of all subordinate users of the given user.

Figure 12:
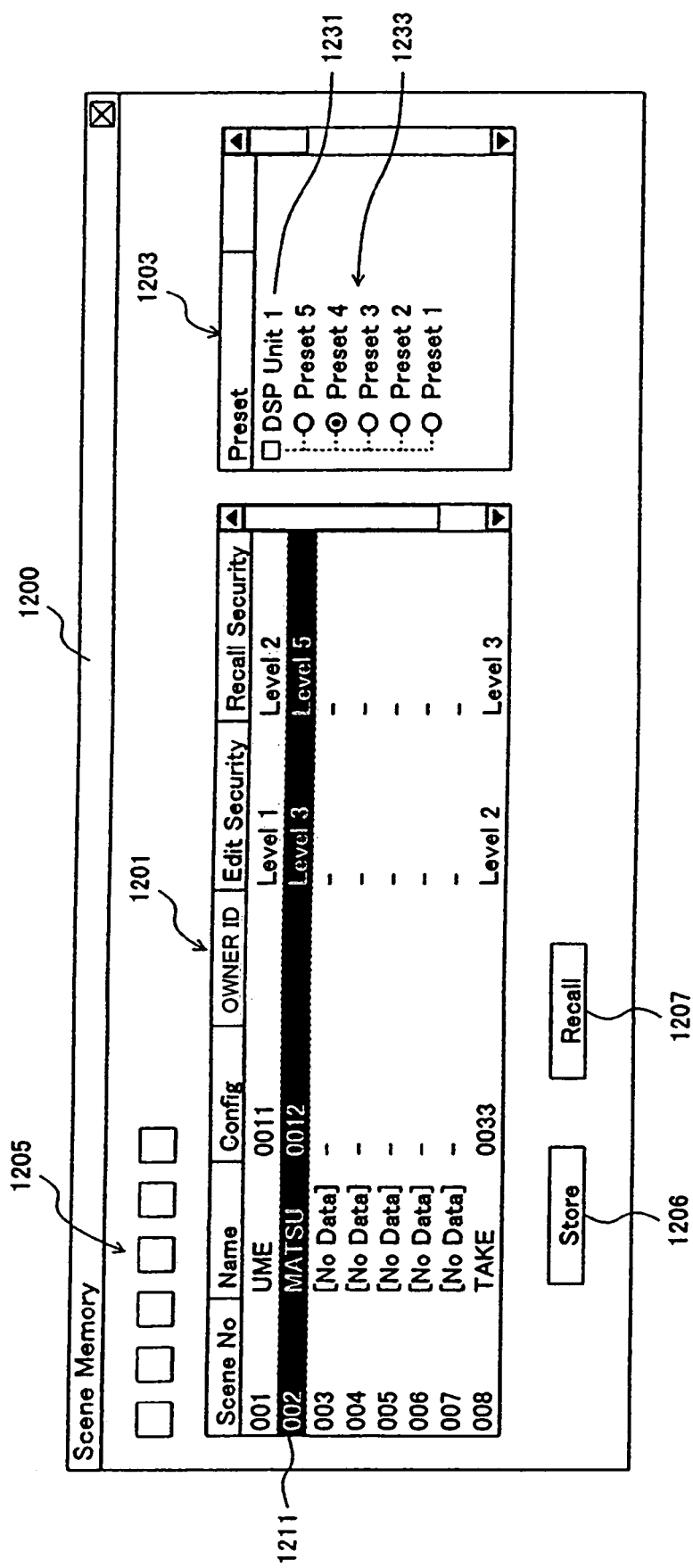
FIG. 12 is a diagram showing a scene memory management dialogue.

FIG. 12 shows an example screen of a Scene Memory Management dialogue 1200. Via this Scene Memory Management dialogue 1200, scene memory editing as explained above in relation to (a) of FIG. 3 is carried out. The Scene Memory Management dialogue 1200 can be called through predetermined operation on the PC 130.

Contents of the scene memory are displayed on a Scene Memory view 1201. Each horizontal row in the displayed contents corresponds to one scene, and as many as 999 scenes can be registered in the scene memory. Selecting one of the horizontal rows (selected horizontal row is displayed in an inverted form, as indicated at 1211) can select a scene to be operated. "Scene No." column indicates scene numbers, "Name" column indicates scene names (if none, [No Data] is displayed), "Config" column indicates configuration numbers, and "Owner ID" column indicates user IDs of respective owners of groups the scenes belong to (as will be later described). Further, an "Edit Security" column indicates security levels of editing (and storage) functions of the scenes, and a "Recall Security" column indicates security levels of recall functions of the scenes. In the selected scene, all items other than the scene No. can be edited; however, the Edit Security and Recall Security can not be set to levels higher than the Scene Store/Recall Level of the logged-on user. Also, the logged-on user can not edit scenes of groups other than the group the logged-on user belongs to, or scenes having Edit Security levels high than the Scene Store/Recall Level of the logged-on user. For example, because the Edit Security level of the scenes 1211 is "3", the scenes 1211 is editable only if the Scene Store/Recall Level of the logged-on user is in a range of "1" to "3", in which case the Edit Security and Recall Security are changeable within a range from the Scene Store/Recall Level of the logged-on user to a value "10".

List of preset numbers included in the current configuration is displayed on a Preset view 1203. Of the displayed preset numbers, one preset number for which a radio button provided before it is ON is the preset number currently set in the selected scene. If the logged-on user has authorization for editing the scene in question, the user can change a desired preset of the scene by clicking on the radio button. Via the Preset view 1203, the logged-on user can also delete any of the presets, except for the preset being currently used. However, it is not possible to delete all of the presets, and thus, at least one of the presets exists at any given time. Whereas configuration numbers and preset numbers are used in the illustrated example, the presets may be identified with their respective configuration names and preset names so that the user can more readily identify them.

Reference numeral 1205 indicates buttons, such as Cut, Paste, Insert and Clear buttons for editing a scene and Rename, Delete, Store and New buttons for editing a preset. In response to clicking on a Store button 1206, the current configuration and current scene are stored into the currently-selected scene. In response to clicking on a Recall button 1207, the currently-selected scene is read as the current configuration and current scene.

The current scene explained above in relation to (b) of FIG. 3 includes storage areas for a Name, Owner ID, Edit Security and Recall Security. Once a scene recall is instructed, the Name etc. of the scene are stored into these storage areas. When the current scene is to be stored as a Scene No., the Name etc. of the storage areas are written as the Name etc. of the Scene No. When the current scene has been initialized, no Name etc. exist, and thus, in storing the scene, an appropriate Name is assigned to the scene in accordance with predetermined rules, the user ID of the owner, which the logged-on user belongs to, is allocated to the scene, and the Edit Security and Recall Security are set at the value of the Store/Recall Level of the logged-on user. Further, in storing/recalling the scene, it is checked whether the logged-on user has appropriate authorization for storing/recalling the scene.

Figure 13:
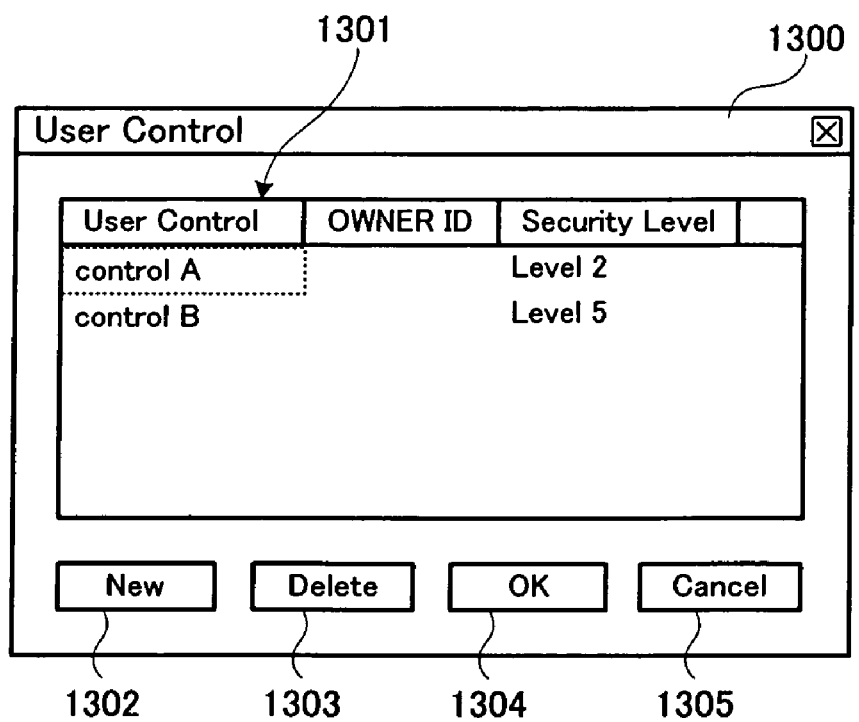
FIG. 13 is a diagram showing a user control management dialogue.

FIG. 13 shows an example screen of a User Control Management dialogue 1300. Via this User Control Management dialogue 1300, editing of the security of a user control screen, as explained above in relation to FIG. 8A or 8B, is carried out. The dialogue 1300 can be called through predetermined operation on the PC 130. List of the name of the user control screen (User Control), owner ID and Security Level is displayed on a User Control view 1301. If the user control screen is not of the group the logged-on user belongs to, or if the Security Level of the user control screen is higher than the User Control Level of the logged-on user (in terms of level values, User Control Level>Security Level), editing of the security of the user control screen is not permitted. With the User Control Management dialogue 1300, it is possible to change the name of the user control screen, create a new user control screen (by means of a New button 1302), delete the user control screen (by means of a Delete button 1303), change the owner ID setting and change the Security Level. However, the Security Level are changeable within a range from the User Control Level of the logged-on user to a value "10". Operation on the dialogue 1300 can be validated and terminated by an OK button 1304, or cancelled and terminated by a Cancel button.

Once creation of a new user control screen is instructed, a new user control screen with no operator and display element is opened in the edit mode, upon which the logged-on user can start editing the user control screen. At that time, the owner ID and Security Level of the user control screen are initially set to the user ID of the owner of the group which the logged-on user belongs to and the Security Level is initially set at the User Control Level of the logged-on user, respectively. Also, the user control screen can be opened in the edit mode by the user selecting the name of the user control screen displayed on the User Control view 1301 and then performing predetermined operation. Of course, when the user control screen is to be edited, it is checked whether the logged-on user has the appropriate authorization, i.e. whether the Edit and View Component Editor checkboxes are ON and the User Control Level is equal to or higher than the Security Level of the user control screen.

Now, a detailed description will be given about the owner IDs shown in FIGS. 12 and 13. The owner ID of each of the scenes shown in FIG. 12 implies that the scene is shared among users of the group of the owner ID. Similarly, the owner ID displayed on the User Control view 1301 shown in FIG. 13 implies that the user control screen is shared among users of the group of the owner ID. "shared" in this case shows that every user belonging to the same group has fundamental authorization for using/editing the scene or user control screen (however, the security level of each of the users is checked). Users belonging to one group can not use/edit a scene or user control screen shared among users of other groups which they do not belongs. In the hierarchical structure of a User List view 404 of FIG. 9, for example, if the logged-on user is Supervisor A, the user can not edit or store/recall scene whose owner ID is Supervisor B. Any user higher in hierarchical position than the group owner can freely use/edit a desired scene and user control screen shared among users of a group owned by an owner who is a subordinate user thereof, but can not use/edit a desired scene or user control screen shared among users of a group owned by an owner who is not a subordinate user thereof Further, for a scene created by a user higher in hierarchical position than a group owner, the owner ID is set as the user ID of the user, and, if it is not changed, the scene can be shared among all subordinate users of the user. For example, a scene created by an Administrator can be used by every user logging on to the control program. However, in the case of a scene, even when the owner ID check indicates that the logged-on user has appropriate authorization, the logged-on user has to be judged, through the comparison between the Scene Store/Recall Level of the logged-on user and the Edit Security and Recall Security of the scene, as currently having appropriate authorization for using the scene. Further, in the case of a user control screen, the logged-on user has to be judged, through the comparison between the User Control Level of the logged-on user and the Security Level of the user control screen, as having authorization for using the user control screen. Namely, unless both the owner ID check and the security level (Scene Store/Recall Level and User Control Level) check indicate that the logged-on user has appropriate authorization, the logged-on user can not perform desired operation; namely, if either one of the two checks indicates that the logged-on user does not have appropriate authorization, then operation instructed by the logged-on user is not permitted.

In the above-described user authorization setting based on the owner ID, it is possible to control use authorization of a scene and user control screen on a group-by-group basis. What can be set as the owner ID is the user ID of an owner of any one of the groups and the user ID of a user who belongs to none of the groups. Scene created by a user of a certain one of the groups is automatically assigned the owner ID of the group, so that the scene can not be used by a user of any other group. When a scene is to be shared among a plurality of groups, it just suffices to set the owner ID of the scene as the user ID of a user who is higher in hierarchical position than any one of the owners of these groups. The user who is higher in hierarchical position than any one of the owners of the groups can change the owner ID, only on condition that the user ID of the user or user ID of its subordinate user has been set as the owner ID of the scene or user control screen. However, what can be set at that time is the user ID of the user in question or user ID of a user of a hierarchical position equal to or higher than its subordinate group owner. In the above-described user authorization setting based on the security level, on the other hand, it is possible to more finely control use authorization of a scene or user control screen on a user-by-user basis, because a comparison is made between the security level set for the scene or user control screen and the specific user level of the logged-on user. Although use of either one of these two checks can achieve advantageous results, using the two checks in combination can achieve more fine user authorization setting.

Next, a detailed description will be made about a case where a supplier supplies a C component and user control screen. If any end users are allowed to freely use these data supplied by the supplier, there is no particular need to protect the data. Generally, signal processing arrangements for a C component supplied by the supplier, types of parameters for controlling the C component, set values of the parameters, etc. contain know-how unique to the supplier, and in some cases, the supplier does not want users to see the construction of the C component and parameters or to change the set parameter values. Further, even where some limitations are put to prevent users from seeing the construction of the C component and parameters, there is a demand that authorization be set to allow only the supplier to edit the C component construction and parameters in a case where the supplier goes to an installed place of a mixer and then adjusts the C component construction and parameters.

In order to meet such a demand, the system of the present invention is arranged to include the user ID and password of the supplier in the C component and user control screen supplied by the supplier. Also, when some logged-on user has attempted to open the C component construction screen of the C component or the user control screen, the instant system checks whether the logged-on user has logged on with the supplier's user ID and password included in the C component or user control screen. The supplier user, having logged on with its user ID and password, can open and edit the C component construction screen with the user ID and password included therein, or open the user control screen with the user ID and password included therein and then operate any of the operators on the screen to thereby change the value of the corresponding parameter item. On the other hand, any user, having logged on with a user ID and password other than the supplier's user ID and password, can not open the C component construction screen or the user control screen with the supplier's user ID and password included therein, irrespective of the security setting of the user (even where the user is an Administrator). Such arrangements will be explained in greater detail below with reference to FIG. 15.

Figure 14A:
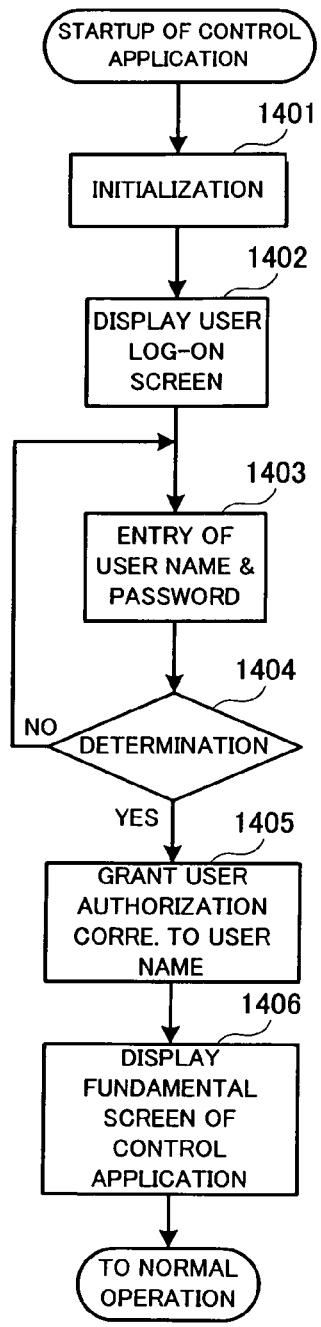
FIGS. 14A-14C are flow charts of processing executed in response to startup of a mixer control program, processing executed in response to selection of security setting, and processing in response to switching of a current configuration.

Various processes included in the mixer control program 131 to be executed by the PC 130 are shown in flow charts of FIGS. 14A to 16B. FIG. 14A shows an example operational sequence of processing carried out when the mixer control program 131 has been started up. Initial setting (or initialization) file is read into the RAM 103 to perform various initialization operations at step 1401, and a user log-on screen of FIG. 5A is displayed at step 1402. Once a user name and password are entered and then the OK button is clicked on at step 1403, the entered user name and password are checked, at step 1404, on the basis of user account data included in the initial setting file. If the logged-on user has been verified as the authentic user of that user name, the processing goes to step 1405. If the entered user name or password is wrong, the processing reverts to step 1403. At step 1405, user authorization (authorization set via the screen of FIG. 9) corresponding to the entered user name is granted to the user, and, at step 1406, the fundamental screen of FIG. 5B is displayed. Configuration data read at this point are data that were read during last execution of the mixer control program 131. After that, the mixer control program 131 shifts to normal operation. Note that, when the Enable Auto Log-On checkbox 901 is ON, steps 1402 to 1404 are skipped and automatic log-on is carried out with the user name designated via the Auto Log-On Combo box 902, although not specifically shown in FIG. 14A.

Figure 14B:
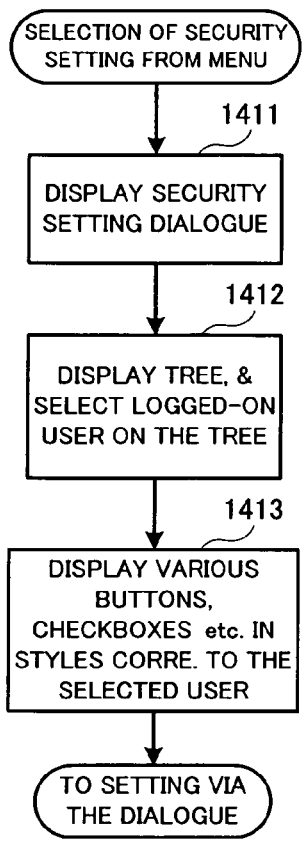

FIG. 14B shows an example operational sequence of processing started up when a security setting has been selected from a menu of the fundamental screen. At step 1411, the security setting dialogue 900, explained above in relation to FIG. 9, is displayed. At next step 1412, a tree indicative of hierarchical relationships is displayed on the User List view 903 on the basis of the user account data stored in the RAM, and, as an initial state, the logged-on user on the tree is placed in a selected condition. At following step 1413, various buttons, checkboxes etc. are displayed in display styles corresponding to the selected user (see FIG. 10).

Figure 14C:
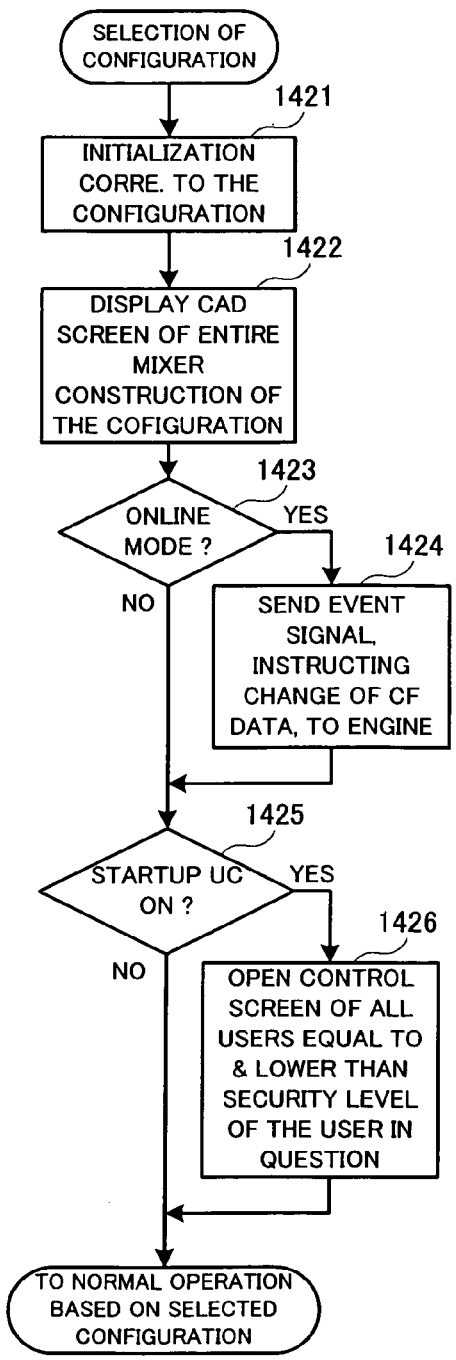

FIG. 14C shows an example operational sequence of processing started up when the current configuration has been switched in response to switching of a scene. This processing is executable only when the Change Configuration checkbox of the logged-on user is ON. Even when a configuration data file has been read in response to log-on or the like, as when operation has been performed to recall a scene representing a CF data set different from the current configuration or when operation has been performed to select a CF data set different from the current configuration, default CF data (such as one last selected by the configuration data), and the instant processing is carried out. At step 1421, various control is initialized in accordance with the CF data set that is to be set as a new current configuration. Namely, the data configuration of the current scene is switched to a data configuration based on PC CAD data of the CF data set, and presets last selected when the CF data set was previously the current configuration are read into the current scene. At step 1422, the fundamental screen (FIG. 5B), indicative of the whole of the mixer construction of the current configuration, is displayed. If the current operation mode is the online mode as determined at step S1423, an event signal, instructing a change in the CF data, is sent to the engine 100 at step 1424. At next step 1425, a determination is made as to whether or not Startup User Control of the logged-on user is ON. If the Startup User Control of the logged-on user is ON as determined at step 1425, a control screen of all users equal to and lower than the Security Level of the logged-on user is opened, after which the instant processing is brought to an end. The user control screen is opened at step 1426 only when the logged-on user has been determined to have appropriate authorization as a result of various checks performed in processing to be later described with reference to section of FIG. 15B.

FIG. 15A shows an example operational sequence of processing started up when an instruction has been given for opening a C component construction screen (FIG. 7). At step S1502, a determination is made, after initial setting at step 1501, as to whether or not the user name and password entered at the time of the log-on agree with the supplier's user ID and password (FIG. 2B) written in the CC header of the C component to be currently opened. If the entered user name and password do not agree with the supplier's user ID and password, it means that a user other than the supplier is attempting to open the construction screen of the C component supplied by the supplier, and thus, the instant processing is brought to an end without performing any further operation. If, on the other hand, the entered user name and password agree with the supplier's user ID and password as determined at step 1502 (including a case where no supplier's user ID and no password are written in the CC header of the C component), the processing goes to step 1503 in order to perform a user authorization check. This user authorization check is intended to ascertain whether or not the View DSP Design Window checkbox has been turned on in the Operation Security area of the logged-on user. If the logged-on user does not have appropriate authorization, the instant processing is brought to an end without performing any further operation. If, on the other hand, the logged-on user has appropriate authorization, the processing goes on to step 1504, where the construction screen of the designated C component is displayed and the processing shifts to operation on the displayed construction screen. For example, if the Edit checkbox of the logged-on user is currently ON, the logged-on user can edit the C component construction displayed on the construction screen. If the View Component Editor checkbox of the logged-on user is currently ON, the logged-on user can select a P component displayed on the screen and perform "control screen opening" operation, to thereby open a control screen of the selected P component.

FIG. 15B shows an example operational sequence of processing started up when an instruction has been given for opening a user control screen (FIG. 8A or 8B). At step S1512, a determination is made, after initial setting at step 1511, as to whether or not the user name and password entered at the time of the log-on agree with the supplier's user ID and password (FIG. 2B) written in the UC data of the user control screen to be currently opened. If the entered user name and password do not agree with the supplier's user ID and password, the instant processing is brought to an end without performing any further operation. If, on the other hand, the entered user name and password agree with the supplier's user ID and password as determined at step 1512 (including a case where no supplier's user ID and no password are written in the UC data), the processing goes to step 1513, where a determination is made as to whether or not the logged-on user belongs to the group represented by the owner ID of the user control screen. Here, let it be assumed that not only a user of the group represented by the owner ID of the user control screen, but also a user higher in hierarchical position than the user represented by the owner ID is determined to belong to the group. If the logged-on user does not belong to the group as determined at step 1513, it means that the logged-on user has no authorization for using the user control screen, and thus, the instant processing is brought to an end without performing any further operation. If, on the other hand, the logged-on user belongs to the group as determined at step 1513, the processing goes to step 1514 in order to perform a user authorization check. This user authorization check is intended to ascertain that the View Component Editor checkbox has been turned on in the Operation Security are of the logged-on user and that the User Control Level of the logged-on user is equal to or higher than the Security Level of the user control screen. If the logged-on user does not have appropriate authorization, the instant processing is brought to an end without performing any further operation. If, on the other hand, the logged-on user has appropriate authorization, the processing goes to step 1515, where the designated user control screen is displayed in the normal mode, and the processing shifts to operation on the displayed screen. For example, if the Control Component Editor checkbox of the logged-on user is currently ON, the logged-on user can operate a predetermined one of the operators on the screen to change the value of the parameter, included in the current scene, corresponding to the operated operator. Further, if the Edit checkbox of the logged-on user is currently ON, the logged-on user can edit the user control screen by selecting the "edit mode" of the right-click menu to place the user control screen in the edit mode.

With the operations at steps 1502 and 1512 above, any P component and user control screen supplied by the supplier can be opened only by the supplier; they can not be opened by end users and other suppliers (even by Administrators).

Whereas the preceding paragraphs have described protection in cases where a supplier supplies a C component and user control screen as additional functions, any desired data included in the configuration data of (a) of FIG. 3 and any desired library of each component too can be protected in a similar manner to the above-described if the arrangements are modified so that a user ID and password are stored as necessary. Particularly, the instant system is characterized by checking whether, when some user has attempted to use an additional function supplied by a supplier, the ID and password imparted to the additional function agree with the ID and password entered by the user at the time of logging-on. In the case of an ordinary application or the like, it has been conventional to check user authorization by causing a user to enter authentication information, attached to additional information, when the user wants to use the additional function. In such a case, there is a possibility of a dishonest or malicious user attempting to break the protection by performing entry of possible authentication information many times. In the instant system, any malicious user, which wants to break the protection, has to redo log on operation many times, which is laborious and troublesome. Thus, the instant system can achieve the superior benefit that the protection is extremely difficult to break.

In the instant embodiment of the system, processing responsive to any instruction given from a user is performed basically in a similar manner to the processing shown in FIG. 15A. Namely, a check concerning a function supplied by a supplier (see step 1502) and a user authorization check as explained above in relation to FIGS. 9-11 are performed, and, only when the two checks indicate that the user has appropriate authorization, the instructed processing is carried out. In addition to these checks, processing similar to that shown in FIG. 15B is carried out, in response to an instruction for using a function and data, for checking whether the logged-on user belongs to the group of the owner (step 1513).

Whereas the instant system is arranged to prevent any end user from opening a C component supplied by a supplier as explained above in relation to FIG. 15A, a user control screen may be automatically opened in place of the construction screen. In such a case, an operation for displaying the predetermined user control screen may be performed when the entered user name and password have not agreed with the supplier's user ID and password. The user control screen to be displayed is prewritten, for example, in a field for contents of the supplier protection. Further, data supplied by the supplier are installed into the instant system on the authority of an Administrator and the above-mentioned owner ID becomes an Administrator.

Figure 16A:
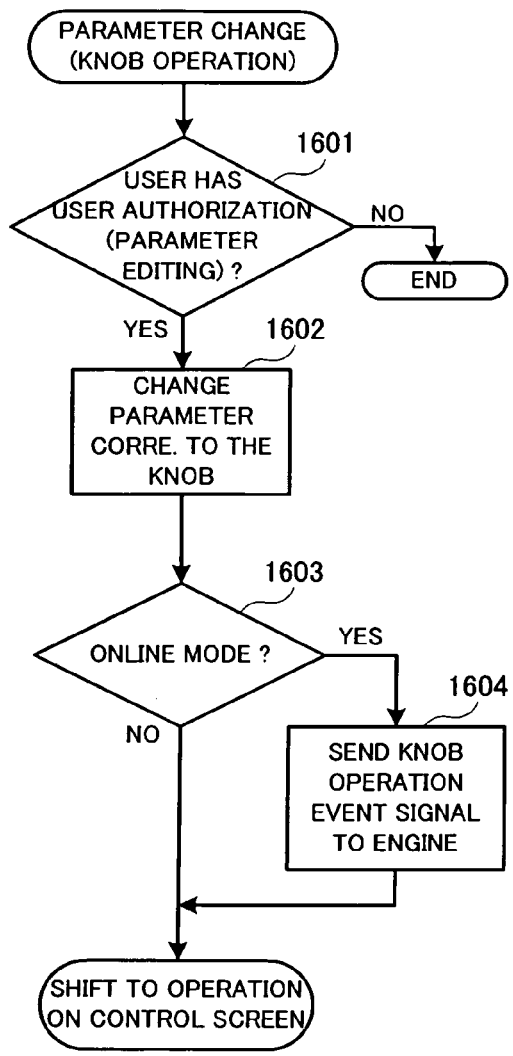
FIGS. 16A and 16B are flow charts of processing executed in response to operation of a knob and scene recall processing.

FIG. 16A shows an example operational sequence of processing started up when any one of knobs displayed on an opened user control screen has been operated by a logged-on user. At step 1601, a user authorization check is performed on the logged-on user. This user authorization check is intended to determine whether the Control Component Editor checkbox of the Operation Security of the logged-on user is currently ON. If the check has indicated that the logged-on user has appropriate authorization, the value of the parameter, included in the current scene, corresponding to the operated knob is changed in accordance with an operated amount of the knob. If the current operation mode is the online mode as determined at step S1603, an operation event signal, corresponding to the operation of the knob, is sent to the engine 100 at step 1604. Other parameter value change operation than the knob operation is executed in a similar manner to the above-described.

Figure 16B:
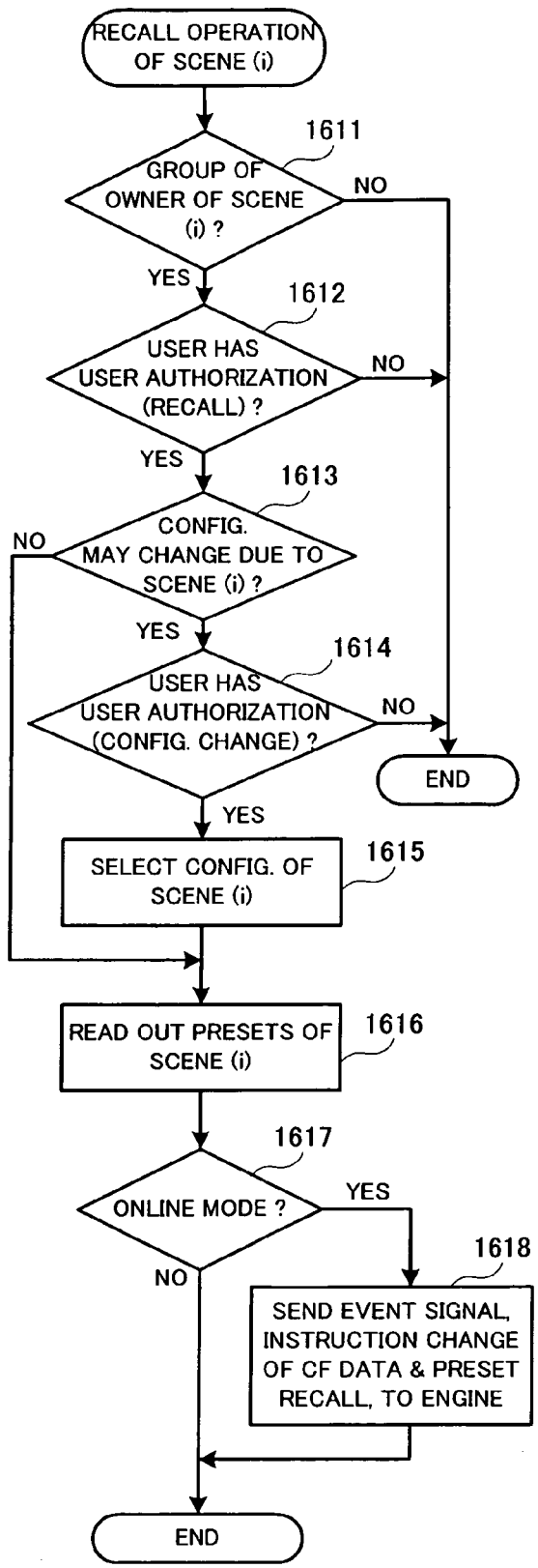

FIG. 16B shows an example operational sequence of processing started up when an instruction has been given for recalling a scene i (see (a) of FIG. 3). At step 1611, a determination is made as to whether or not the logged-on user belongs to the group represented by the owner ID of the scene i. As at step 1513 above, let it be assumed here that not only a user of the group represented by the owner ID, but also a user higher in hierarchical position than the user represented by the owner ID is determined to belong to the group. If the logged-on user belongs to the group as determined at step 1611, the processing goes to step 1612, where or not the logged-on user has appropriate authorization for recalling the scene. This is intended to determine whether the logged-on user has appropriate authorization for recalling, by comparing the Scene Store/Recall Level of the Operation Security of the logged-on user and the Recall Security of the scene to be now recalled. If the logged-on user has been determined to have the appropriate authorization, it is further determined, at step 1613, whether or not the current configuration may change due to the recall of the scene i. If it has been determined, at step 1613, that the current configuration may change, a further determination is made, at step 1614, as to whether or not the logged-on user has appropriate authorization for changing the configuration. This determination is intended to determine whether the Change Configuration checkbox of the Operation Security of the logged-on user is currently ON. If the check has indicated that the logged-on user has the appropriate authorization, the CF data set designated by the scene i is selected at step 1615 and set as the current configuration, and then the processing goes to step 1616. If the current configuration may not change as determined at step 1613, the processing jumps to step 1616. At step 1616, presets designated by the scene i are read out and set in the current scene.

Whereas the preceding paragraph has described scene recall processing, storage of a scene is carried out generally in a similar manner to the scene recall processing. When a scene is to be stored, and if another scene has already stored in a scene number designated as a stored-to destination, a check is performed as to whether the logged-on user belongs to the group of the owner of the scene stored in that scene number.

Whereas the above-described embodiment is arranged in such a manner that any user not belonging to a given is not allowed to use the scene data and user control screen of the given group.

Copied-from source of operators and display elements, which are to be placed on a user control screen set as a control screen of a C component supplied by a supplier, is limited to control screens of P components that are constituent elements of the C component. The CC data may be data included in the configuration data illustrated in (a) of FIG. 3.

Further, the above-described embodiment of the present invention is arranged in such a manner that the supplier protections are turned ON when a user ID and password are stored in the CC header of the CC data or UC data of the CF data while the supplier protections are turned OFF when no user ID and no password are stored in the CC header of the CC data or UC data of the CF data. Alternatively, ON/OFF of the supplier protection may be controlled in accordance with any other suitable data (e.g., data indicative of the contents of the supplier protection).

Furthermore, the above-described embodiment is arranged to apply a plurality of protections to each processing to be executed in response to operation of a user. The present invention may be arranged in such a manner that, when given processing has not been executed due to any of the protections, the system indicates due to which of the protections the given processing has not been executed.

What is claimed is:

1. A user authorization management method for, when a program or data for providing an additional function is to be incorporated into a system having a given fundamental function and realized on a computer, managing end users' use authorization for using the program or data, said user authorization management method comprising:
    a step of storing, into a first storage section provided in the computer, first authentication information to be used for authenticating one or more users having use authorization of the system;
    a step of, through a log-on check procedure executed by the computer, confirming whether a user trying to log-on is an authentic user or not, based on information entered by the user and the first authentication information stored in said first storage section, and then permitting log-on of the user to the system if the confirmation is affirmative;
    a step of obtaining the program or data for providing the additional function from a supplier, the program or data being created by the supplier and including second authentication information that authenticates the supplier authorized to use or to edit the program or data, and storing the program or data into a second storage section provided in the computer;
    a step of, when the logged-on user has requested to use or to edit the program or data, authenticating, through an authentication procedure executed by the computer, whether the logged-on user is a user authorized to use or to edit the program or data, based on the information entered by the logged-on user at said step of confirming and the second authentication information included in the program or data; and
    a step of, through a control procedure executed by the computer, authorizing the logged-on user to use or to edit the program or data when the logged-on user has been authenticated, through the authentication procedure, but not authorizing the logged-on user to use or to edit the program or data when the logged-on user has not been authenticated.

2. A user authorization management method for, when a program or data for providing an additional function is to be incorporated into a system on a computer having a given fundamental function, managing end users' use authorization for using the program or data, said user authorization management method comprising:
    a step of storing, into a first storage section provided in the computer, first authentication information to be used for authenticating a user having use authorization of the system;
    a step of, through a log-on check procedure executed by the computer, confirming whether a user trying to log-on is an authentic user or not based on information entered by the user and the first authentication information stored in said first storage section, and then permitting log-on of the user to the system if the confirmation is affirmative;
    a step of obtaining the program or data for providing the additional function from a supplier, the program or data being created by the supplier and including second authentication information that authenticates the supplier authorized to use or to edit the program or data and also including protection information indicative of partial authorization or partial inhibition related to the program or data, and storing the program or data into a second storage section provided in the computer;
    a step of, when the logged-on user has requested to use or to edit the program or data, authenticating, through an authentication procedure executed by the computer, whether the logged-on user is a user authorized to use or to edit the program or data, based on the information entered by the logged-on user at said step of confirming and the second authentication information included in the program or data; and
    a step of, through a control procedure executed by the computer, fully authorizing the logged-on user to use or to edit the program or data when the logged-on user has been authenticated, through the authentication procedure, but partially authorizing the logged-on user to use or to edit the program or data, within a range corresponding to the partial authorization or partial inhibition indicated by the protection information included in the program or data, when the logged-on user has not been authenticated.

3. A computer-readable storage medium containing a group of instructions for causing a computer to perform a user authorization management method for, when a program or data for providing an additional function is to be incorporated into a system having a given fundamental function and realized on the computer, managing end users' use authorization for using the program or data, said user authorization management method comprising:
    a step of storing, into a first storage section provided in the computer, first authentication information to be used for authenticating one or more users having use authorization of the system;
    a step of, through a log-on check procedure executed by the computer, confirming whether a user trying to log-on is an authentic user or not, based on information entered by the user and the first authentication information stored in said first storage section, and then permitting log-on of the user to the system if the confirmation is affirmative;

a step of obtaining the program or data for providing the additional function from a supplier, the program or data being created by the supplier and including second authentication information that authenticates the supplier authorized to use or to edit the program or data and storing the program or data into a second storage section provided in the computer;

a step of, when the logged-on user has requested to use or to edit the program or data, authenticating, through an authentication procedure executed by the computer, whether the logged-on user is a user authorized to use or to edit the program or data, based on the information entered by the logged-on user at said step of confirming and the second authentication information included in the program or data; and a step of, through a control procedure executed by the computer, authorizing the logged-on user to use or to edit the program or data when the logged-on user has been authenticated, through the authentication procedure, but not authorizing the logged-on user to use or to edit the program or data when the logged-on user has not been authenticated.

4. The computer-readable storage medium as claimed in claim 3 wherein the first and second authentication information stored in said first storage section and said second storage section comprises an identifier and password that identify the user.

5. The computer-readable storage medium as claimed in claim 3 wherein said group of instructions are incorporated in a given application program, and wherein said application program is a mixer engine control program that performs a display/edit function for displaying/editing a mixer construction defining sound signal mixing processing to be performed by a signal processing apparatus and a control function for controlling the sound signal mixing processing to be performed by the signal processing apparatus.

6. A computer-readable storage medium containing a group of instructions for causing a computer to perform a user authorization management method for, when a program or data for providing an additional function is to be incorporated into a system on the computer having a given fundamental function, managing end users' use authorization for using the program or data, said user authorization management method comprising:

a step of storing, into a first storage section provided in the computer, first authentication information to be used for authenticating a user having use authorization of the system;

a step of, through a log-on check procedure executed by the computer, confirming whether a user trying to log-on is an authentic user or not, based on information entered by the user the first authentication information stored in said first storage section, and then permitting log-on of the user to the system if the confirmation is affirmative;

a step of obtaining the program or data for providing the additional function from a supplier, the program or data being created by the supplier and including second authentication information that authenticates the supplier authorized to use or to edit the program or data and also including protection information indicative of partial authorization or partial inhibition related to the program or data, and storing the program or data into a second storage section provided in the computer;

a step of, when the logged-on user has requested to use or to edit the program or data, authenticating, through an authentication procedure executed by the computer, whether the logged-on user is a user authorized to use or to edit the program or data, based on the information entered by the logged-on user at said step of confirming and the second authentication information included in the program or data; and a step of, through a control procedure executed by the computer, fully authorizing the logged-on user to use or to edit the program or data when the logged-on user has been authenticated, through the authentication procedure, but partially authorizing the logged-on user to use or to edit the program or data, within a range corresponding to the partial authorization or partial inhibition indicated by the protection information included in the program or data, when the logged-on user has not been authenticated.

7. A computer-readable storage medium as claimed in claim 6 wherein the first and second authentication information stored in said first storage section and said second storage section comprises an identifier and password that identify the user.

8. A computer-readable storage medium claimed in claim 6 wherein, when an authentication information field in the program or data stored in said second storage is blank, reference is made to the protection information field is not empty, the logged-on user is partially authorized to use or edit the program or data within a range corresponding to the partial authorization or partial inhibition indicated by the protection information.

9. A computer-readable storage medium claimed in claim 6 wherein said group of instructions are incorporated in a given application program, and wherein said application program is a mixer engine control program that performs a display/edit function for displaying/editing a mixer construction defining sound signal mixing processing to be performed by a signal processing apparatus and a control function for controlling the sound signal mixing processing to be performed by the signal processing apparatus.

* * * * *